(12) United States Patent
Shima

(10) Patent No.: US 9,000,060 B2
(45) Date of Patent: Apr. 7, 2015

(54) EXPANDABLE MODIFIED RESIN BEADS, EXPANDED MODIFIED RESIN BEADS, AND FOAMED MOLDED ARTICLE FORMED FROM EXPANDED MODIFIED RESIN BEADS

(71) Applicant: JSP Corporation, Chiyoda-ku (JP)

(72) Inventor: Masaomi Shima, Mie (JP)

(73) Assignee: JSP Corporation, Chiyoda-ku (JP)

( * ) Notice: Subject to any disclaimer, the term of this patent is extended or adjusted under 35 U.S.C. 154(b) by 0 days.

(21) Appl. No.: 14/279,907

(22) Filed: May 16, 2014

(65) Prior Publication Data

US 2014/0249240 A1    Sep. 4, 2014

Related U.S. Application Data

(62) Division of application No. 13/390,250, filed as application No. PCT/JP2010/062159 on Jul. 20, 2010, now abandoned.

(30) Foreign Application Priority Data

Aug. 20, 2009   (JP) .................................. 2009-190726

(51) Int. Cl.
 *C08J 9/18*   (2006.01)
 *C08J 9/16*   (2006.01)
 (Continued)

(52) U.S. Cl.
 CPC .. *C08J 9/18* (2013.01); *C08J 9/141* (2013.01); *C08J 9/16* (2013.01); *C08J 2203/14* (2013.01); *C08J 2325/04* (2013.01); *C08J 2423/02* (2013.01)

(58) Field of Classification Search
 USPC ................................................ 521/56, 59, 60
 See application file for complete search history.

(56) References Cited

U.S. PATENT DOCUMENTS

| 7,964,652 B2 * | 6/2011 | Okamura et al. ................ 521/60 |
| 2009/0186954 A1 | 7/2009 | Okamura et al. |

FOREIGN PATENT DOCUMENTS

| CN | 101448884 A | 6/2009 |
| JP | 45 32623 | 10/1970 |
| JP | 50 139167 | 11/1975 |

(Continued)

OTHER PUBLICATIONS

International Search Report Issued Aug. 17, 2010 in PCT/JP10/062159 Filed Jul. 20, 2010.

(Continued)

*Primary Examiner* — Kara Boyle
(74) *Attorney, Agent, or Firm* — Oblon, McClelland, Maier & Neustadt, L.L.P.

(57) ABSTRACT

Disclosed is expandable modified resin beads (1), comprising a modified resin as a base resin in which a dispersion phase (3) containing a styrene resin as a major component is dispersed in a continuous phase (2) containing an olefin resin as a major component, and a physical blowing agent. Further disclosed are expanded modified resin beads obtained by expanding the expandable modified resin beads (1), and a foamed molded article formed from the expanded modified resin beads obtained by molding the expanded modified resin beads in a mold. A volume average diameter of the dispersion phase (3) dispersed in the continuous phase (2) is 0.55 μm or more. The expandable modified resin beads (1) have, as a base resin, the modified resin contains 80 to 50 parts by mass of the styrene resin with respect to 20 to 50 parts by mass parts of the olefin resins.

16 Claims, 7 Drawing Sheets

(51) Int. Cl.
*C08J 9/40* (2006.01)
*C08J 9/14* (2006.01)

(56) References Cited

FOREIGN PATENT DOCUMENTS

| | | |
|---|---|---|
| JP | 01 284536 | 11/1989 |
| JP | 2006 070202 | 3/2006 |
| JP | 2007 321021 | 12/2007 |
| JP | 2009 114432 | 5/2009 |
| JP | 2009 242692 | 10/2009 |
| WO | 2007 138916 | 12/2007 |
| WO | WO 2007138916 A1 * | 12/2007 |
| WO | 2008 093877 | 8/2008 |

OTHER PUBLICATIONS

Combined Chinese Office Action and Search Report issued Jan. 4, 2013, in Chinese Patent Appplication No. 201080035168.6 with English translation.
Japanese Notification of Reasons for Refusal issued Dec. 11, 2013 in co-pending Japanese Patent Application No. 2009-190726, filed on Aug. 20, 2009, and English translation thereof, 6 pages.
U.S. Appl. No. 14/342,295, filed Feb. 28, 2014, Shima, et al.

* cited by examiner

Example 1

1 μm

Example 6

Example 7

Example 16

Example 17

Comparative Example 3

EXPANDABLE MODIFIED RESIN BEADS, EXPANDED MODIFIED RESIN BEADS, AND FOAMED MOLDED ARTICLE FORMED FROM EXPANDED MODIFIED RESIN BEADS

CROSS REFERENCE TO RELATED APPLICATION(S)

This application is a divisional of U.S. application Ser. No. 13/390,250, filed on Feb. 13, 2012, which is a 35 U.S.C. 371 national stage patent application of international patent application PCT/JP10/62159, filed on Jul. 20, 2010, the text of which is incorporated by reference, and claims foreign priority to JP 2009-190726 Filed on Aug. 20, 2009, the entire content of which is incorporated herein by reference.

TECHNICAL FIELD

The present invention relates to expandable modified resin beads that have a modified resin containing an olefin resin and a styrene resin as a base resin, expanded modified resin beads which are obtained by foaming and expanding the expandable modified resin beads, and a foamed molded article formed from the expanded modified resin beads, which are obtained by molding the expanded modified resin beads in a mold.

BACKGROUND ART

A foamed molded article formed from expanded olefin resin beads is excellent in impact resistance, bending deflection, and restoring property to repetitive stress distortion in comparison to a foamed molded article formed from expanded styrene resin beads, and thus is used as a cushioning material or a packaging material for a precision component, a weight product or the like. In addition, a foamed molded article formed from expanded olefin resin beads is also excellent in heat resistance and grease resistance, and thus is also used as an automobile member such as a shock absorber, a bumper and a floor spacer. As described above, a foamed molded article formed from expanded olefin resin beads is widely used for various uses.

A foamed molded article formed from expanded olefin resin beads has been prepared as described below.

Specifically, first, olefin resin beads are put into a closed pressure vessel along with an aqueous medium, further a physical blowing agent is pressed into the vessel, and blowing agent is impregnated into the olefin resin beads under a condition of high temperature and high pressure. Subsequently, obtained expandable olefin resin beads are discharged to a low pressure region along with the aqueous medium, and foamed and expanded, whereby to give the expanded olefin resin beads. Next, the expanded olefin resin beads are molded in a mold, whereby to give a foamed molded article formed from expanded olefin resin beads.

A foamed molded article formed from expanded styrene resin beads can be prepared in the same manner as those for the foamed molded article formed from the expanded olefin resin beads described above in a point that both are obtained by molding expanded beads in a mold. However, in the process for preparing a foamed molded article formed from expanded styrene resin beads, expandable styrene resin beads containing a blowing agent may be stored for a long period of time, upon removed from a closed pressure vessel, with maintaining a foam property, and which is greatly different from the process for preparing a foamed molded article formed from expanded olefin resin beads.

Specifically, in manufacture of a foamed molded article formed from expanded styrene resin beads, first, a physical blowing agent, which is pressed into a closed pressure vessel, is impregnated into a styrene resin during polymerization or after polymerization of the styrene resin beads in the closed pressure vessel. The obtained expandable styrene resin beads can maintain a state where foam property is maintained for some period even when taken out from the inside of the closed pressure vessel, and thus can be stored or transported by a well-known method. Then, the expandable styrene resin beads are timely put into an expanding machine, and foamed and expanded by being heated in a heating medium whereby to give expanded styrene resin beads. The obtained expanded styrene resin beads are molded in a mold as described above, whereby to give a foamed molded article formed from expanded styrene resin beads.

On the other hand, an olefin resin has a property of easily permeating a physical blowing agent such as butane. Therefore, even though expandable olefin resin beads are manufactured by impregnating olefin resin beads with a blowing agent, the blowing agent dissipates after several hours of the preparation, and foam property prominently decreases. Accordingly, it is difficult to store expandable olefin resin beads for a long time after the preparation, and it is necessary to obtain expanded beads by foaming and expanding the expandable olefin resin beads within a short time after the preparation. Consequently, it is necessary to install an expanding machine and a molding machine in the vicinity of a facility for impregnation of a blowing agent, or, it is necessary to prepare expanded beads by so-called direct expansion, and thus there is a limit in a production base.

As described above, in a process of preparing a foamed molded article formed from expanded olefin resin beads, transport and storage in a state of expandable resin beads are difficult, and the transport and storage must be performed in a state of expanded beads or a molded article. Therefore, a foamed molded article formed from expanded olefin resin beads has high transport and storage cost for its preparation, and is economically disadvantageous in comparison with a foamed molded article formed from expanded styrene resin beads.

In addition, a foamed molded article formed from expanded styrene resin beads is excellent in compression strength in comparison to a foamed molded article formed from expanded olefin resin beads, and thus can increase the expansion ratio depending on its use in comparison to a foamed molded article formed from expanded olefin resin beads. Therefore, a foamed molded article formed from expanded styrene resin beads was advantageous in a point of lightweight properties in comparison to a foamed molded article formed from expanded olefin resin beads.

In order to solve the problems related to a foamed molded article formed from expanded olefin resin beads described above, techniques described below are developed, for example.

Specifically, there is developed, for example, a method of adding a cross-linking agent to a resin granular substance, which is composed of urea, polyamide, and an aliphatic olefin polymer such as polyethylene, and performing a cross-linking treatment by suspending and heating in a dispersion medium selected from water, alcohol and ketones having a low boiling point, so that the resin granular substance, which has been subjected to the cross-linking treatment, is impregnated with the dispersion medium acting as a blowing agent (refer to Patent Document 1).

In addition, there is developed a method of obtaining modified polyethylene resin beads by impregnating polyethylene resin nuclear particles with vinyl aromatic monomers, and carrying out polymerization and cross-linking of the vinyl aromatic monomers (refer to Patent Documents 2 and 3).

In addition, there is developed a method of preparing expandable modified resin beads by preparing polyethylene mixed resin nuclear particles from an acrylonitrile-styrene copolymer and a polyethylene polymer, suspending the polyethylene mixed resin nuclear particles in an aqueous medium, adding styrene monomers to this suspension and carrying out polymerization and impregnation of the blowing agent (refer to Patent Document 4).

RELATED ART DOCUMENT

Patent Document

Patent Document 1: Unexamined Japanese Patent Application Publication No. 50-139167
Patent Document 2: Examined Japanese Patent Application Publication No. 45-32623
Patent Document 3: Unexamined Japanese Patent Application Publication No. 1-284536
Patent Document 4: Unexamined Japanese Patent Application Publication No. 2007-321021

DISCLOSURE OF THE INVENTION

Problems to be Solved by the Invention

However, the method of Patent Document 1 has problems that alcohols or ketones having a low boiling point cannot exert sufficient functions as a blowing agent for polyethylene resin beads, in spite of an excellent retaining property of blowing agent, and thus foam property is low.

On the other hand, the methods of Patent Document 2 and Patent Document 3, can improve the retaining property of a blowing agent and the strength of an foamed molded article with increase of the percentage of vinyl aromatic monomers with respect to polyethylene resin beads, but needs to increase the percentage of vinyl aromatic monomers considerably in order to obtain sufficient retaining property of the blowing agent. As a result, there is a fear that a unique property, i.e., bending deflection of polyethylene could not be exhibited.

In addition, the expandable modified resin beads obtained in the method of Patent Document 4 are improved in the retaining property of a blowing agent in comparison with those obtained in the methods of Patent Document 2 and Patent Document 3, but not enough when compared to expandable styrene resin beads, and still have room to improve.

The teachings related to the present invention have been done in reflection of such problems, and are intended to provide expandable modified resin beads that can show excellent retaining property of a blowing agent and excellent bending deflection of an olefin resin after being foamed, expanded and molded, expanded modified resin beads which are obtained by using the expandable modified resin beads, and a foamed molded article formed from the expanded modified resin beads.

Means of Solving the Problems

The first teaching is expandable modified resin beads, comprising:
a modified resin as a base resin in which a dispersion phase containing a styrene resin as a major component is dispersed in a continuous phase containing an olefin resin as a major component; and
a physical blowing agent,
wherein a volume average diameter of the dispersion phase dispersed in the continuous phase is 0.55 μm or more.

The second teaching is expanded modified resin beads, which are obtained by heating the above-mentioned expandable modified resin beads in a heating medium to foam and expand the expandable modified resin beads.

The third teaching is a foamed molded article formed from expanded modified resin beads, which are obtained by molding the above-mentioned expanded modified resin beads in a mold.

Effects of the Invention

In the expandable modified resin beads, the volume average diameter of the dispersion phase dispersed in the continuous phase is 0.55 μm or more.

As described above, since the expandable modified resin beads have the dispersion phase having such large volume average diameter, the dispersion phase can retain the physical blowing agent sufficiently. Therefore, the expandable modified resin beads are excellent in retaining property of a blowing agent in comparison with conventional expandable modified resin beads that are equivalent in ratio of the resin composition.

In addition, the expandable modified resin beads have a modified resin as a base resin, which is constituted by dispersing a dispersion phase containing a styrene resin as a major component in a continuous phase containing an olefin resin as a major component. Therefore, a foamed molded article formed from the expanded modified resin beads, which are obtained by foaming, expanding and molding the above-mentioned expandable modified resin beads, can easily exhibit excellent bending deflection of an olefin resin.

Furthermore, the expandable modified resin beads have a modified resin as a base resin, which is constituted by dispersing a dispersion phase containing a styrene resin as a major component in a continuous phase containing an olefin resin as a major component, and preferably contain the olefin resin and the styrene resin in the ratio of 20/80 to 50/50 by mass ratio. In this case, a foamed molded article formed from the expanded modified resin beads, which are obtained by foaming, expanding and molding the expandable modified resin beads can exhibit furthermore excellent bending deflection of an olefin resin by expanded beads themselves.

In the expandable modified resin beads, at least the dispersion phase preferably contains the dispersion diameter-enlarging agent in the certain amount, and expandable modified resin beads preferably fulfill a relationship of 1.25 V<V$_0$, wherein V (g/hour) represents a blowing agent-decrease rate of the expandable modified resin beads containing the dispersion diameter-enlarging agent, and V$_0$ (g/hour) represents a blowing agent-decrease rate of expandable modified resin beads that are identical to the above-mentioned expandable modified resin beads in resin composition except for not containing the dispersion diameter-enlarging agent and not being enlarged in dispersion diameter of the dispersion phase. This leads that the expandable modified resin beads are excellent in retaining property of a physical blowing agent in comparison with conventional expandable modified resin beads having an equivalent resin composition except that they do not contain a dispersion diameter-enlarging agent while containing an olefin resin and a styrene resin in the certain ratio. Particularly, in storage under ambient temperature, the expandable modified resin beads are excellent in retaining property of a physical blowing agent in comparison to conventional ones. Therefore, the expandable modified resin beads allow long period storage in a state of being put into a closed pressure vessel while sufficiently maintaining expanding force, and allow ambient temperature storage in a state where the expandable modified resin beads are put into a closed pressure vessel, which was difficult conventionally. As a result, it is possible to easily perform transportation and storage in a state of the expandable modified resin beads without necessarily foaming and expanding the expandable modified resin beads within a short time after preparation of the expandable modified resin beads to obtain expanded modified resin beads.

In addition, the expanded modified resin beads are obtained by heating the expandable modified resin beads in a heating medium to foam and expand the expandable modified resin beads.

The foamed molded article formed from the expanded modified resin beads is obtained by molding the above-mentioned expanded modified resin beads in a mold.

Therefore, the expanded modified resin beads may be formed by exploiting excellent properties of the expandable modified resin beads, such that variations of the apparent density of expanded beads are reduced resulting from the fact that the expandable modified resin beads may be stored for a long period of time or transported, as they are, allowing for formation of the expanded modified resin beads which are excellent in uniformity. As a result, the expanded modified resin beads may be charged into a mold efficiently. In addition, the molded article formed from the expanded modified resin beads is excellent in appearance and mutual fusion bonding of the expanded beads. Further, the molded article exhibits mechanical properties being reduced in variation, excellent mechanical properties of a styrene resin, and excellent bending deflection of an olefin resin (toughness)

MODE(S) FOR CARRYING OUT THE INVENTION

Figure 1:
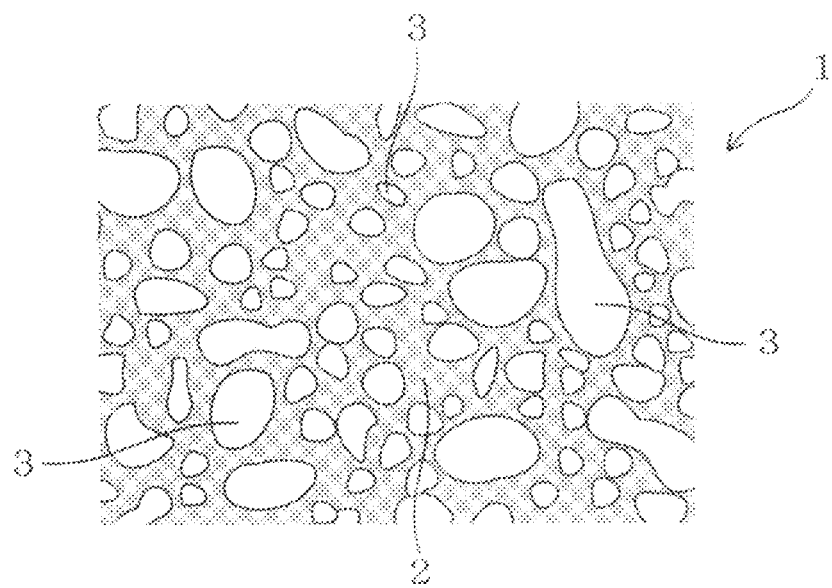
FIG. 1 is an explanation drawing that schematically illustrates the internal cross-section of expandable modified resin beads of Example 1.

Next, illustrative embodiments for conducting the present invention will be explained.

The expandable modified resin beads have a modified resin, which is constituted by dispersing a dispersion phase containing a styrene resin as a major component in a continuous phase containing an olefin resin as a major component, as a base resin.

In a case where the internal cross-section of the expandable modified resin beads is observed with a transmission electron microscope, the cross-section preferably forms a sea-island structure in which the granular dispersion phase of an approximately circular form and/or an infinite form is dispersed in the continuous phase.

In a case where the dispersion phase contains the dispersion diameter-enlarging agent described below, the phase of the dispersion diameter-enlarging agent may be observed to be dispersed in the salami form in the dispersion phase in observation of the internal cross-section with a transmission microscope described above.

The dispersion phase is preferably dispersed in a volume average diameter of 0.55 μm or more from a viewpoint of retaining property of the physical blowing agent in the expandable modified resin beads. In a case where the volume average diameter of the dispersion phase is less than 0.55 μm, dissipation of the blowing agent tends to increase. The volume average diameter of the dispersion phase is more preferably 0.6 μm or more, and further preferably 0.7 μm or more. In addition, the volume average diameter of the dispersion phase is preferably 10 μm or less from a viewpoint if the volume average diameter of the dispersion phase is too large, that there is a fear that a foamed molded article formed from the expanded modified resin beads after being molded becomes easily broken and the bending strength property decreases.

The volume average diameter of the dispersion phase can be adjusted, for example, by adding the dispersion diameter-enlarging agent described below. In addition, the volume average diameter of the dispersion phase can be also adjusted by adjusting polymerization temperature or an amount of a polymerization initiator whereby to control a polymerization rate, and thus prolong the time in which an olefin resin is impregnated with styrene-based monomers, and the styrene-based monomers gather at styrene-based monomers or styrene resin, which previously exists in the olefin resin.

As for the volume average diameter of the dispersion phase, using a photograph (the enlargement magnification ratio is preferably 10,000 times) of the central part of the expandable modified resin beads (the central part of the cross-section when expandable modified resin beads are equally divided into two) taken with a transmission electron microscope, the area of each dispersion phase is calculated for all (100 or more) dispersion phases on the photograph, and each equivalent circle diameter calculated from the area is assumed as a representative diameter of the dispersion phase, which is an average diameter computed with a formula $(\Sigma ni \cdot di^3/\Sigma ni)^{1/3}$ (wherein di is the equivalent circle diameter [μm] in three significant figures, and ni is the number thereof). The equivalent circle diameter is calculated with the method described in Examples described below. In addition, the reasons why measurement of the volume average diameter of the dispersion phase is made on the basis of a photograph of the central part of the expandable modified resin beads using a transmission electron microscope, is in accordance to the confirmed fact that those fulfilling the above-mentioned certain range of the volume average diameter in the central part can accomplish excellent effects of retaining property of a blowing agent. In addition, it is contemplated that for those fulfilling the constitution of the numerical range of the volume average diameter of the central part of the resin beads, the volume average diameter of the dispersion phase fulfills the above-mentioned certain numerical range value not only for the central part of the resin beads, but also for approximately the whole body excluding the surface part of the resin beads.

The dispersion phase of the expandable modified resin beads is dispersed in various forms such as a circular form, an ellipsoidal form, a polygonal form and an infinite form in a continuous phase. The dispersion phase of the expandable modified resin beads is preferably dispersed in an infinite form that allows increase of the area, for example, or an infinite form that is formed by coalescence of two or more dispersion phases, rather than a finite form such as a circular form or a polygonal form from a viewpoint of retaining property of a blowing agent. A dispersion phase in which two or more dispersion phases coalesce is treated as one dispersion phase, and an equivalent circle diameter calculated from the area of the dispersion phase coalesced is assumed as a representative diameter of the dispersion phase.

In addition, in the expandable modified resin beads, when the total area of the dispersion phases is indicated as A (μm$^2$) and the total area of the dispersion phase having 0.6 μm$^2$ or more of the area is indicated as B (μm$^2$), the percentage of the dispersion phase having 0.6 μm$^2$ or more of the area (B/A× 100) is preferably 25% or more.

In this case, it is possible to further improve the retaining property of the blowing agent in the expandable modified resin beads. The percentage of the dispersion phase having 0.6 μm$^2$ or more of the area (B/A×100) is more preferably 35% or more, and further preferably 60% or more.

The percentage of the dispersion phase having 0.6 μm$^2$ or more of the area can be adjusted, for example, by the same method as the method of adjusting the volume average diameter of the dispersion phase. Specifically, for example, the percentage of the dispersion phase having 0.6 μm$^2$ or more of the area can be adjusted by adjusting polymerization temperature or an amount of a polymerization initiator whereby to control a polymerization rate, and thus prolong the time in which the dispersion diameter-enlarging agent gathers at the styrene-based monomer.

The percentage of the dispersion phase having 0.6 μm$^2$ or more of the area can be calculated by the procedures described below.

Specifically, first, the central part of the expandable modified resin beads is filmed to take a picture of 100 pieces or more of the dispersion phase with a transmission electron microscope. The enlargement magnification ratio is preferably 10,000 times. Next, the area of all the dispersion phases having 0.6 μm$^2$ or more of the area present in the filmed photograph is respectively measured, and the total value B (μm$^2$), specifically, the total area B (μm$^2$) of all the dispersion phases having 0.6 μm$^2$ or more of the area is computed. In addition, the area of all of the dispersion phases present in the filmed photograph is measured respectively, and the total value A (μm$^2$), specifically, the total area A (μm$^2$) of all the dispersion phases present in the photograph is computed. The percentage of the dispersion phase having 0.6 μm$^2$ or more of the area (%) can be calculated by representing a percentage by dividing the total area B (μm$^2$) of all the dispersion phases having 0.6 μm$^2$ or more of the area present in the photograph, by the total area A (μm$^2$) of all the dispersion phases present in the photograph.

As the olefin resin constituting the continuous phase, use can be made of ethylene-based resins such as a low density polyethylene, a linear low density polyethylene, a high density polyethylene, an ethylene-propylene copolymer, an ethylene-propylene-butene-1 copolymer, an ethylene-butene-1 copolymer, an ethylene-vinyl acetate copolymer, an ethylene-acrylic acid copolymer, an ethylene-acrylic acid alkyl ester copolymer and an ethylene-methacrylic acid alkyl ester copolymer, and propylene-based resins such as a propylene homopolymer, a propylene-ethylene copolymer, a propylene-butene-1 copolymer, a propylene-ethylene-butene-1 copolymer and a propylene-4-methylpentene-1 copolymer. In addition, a mixture thereof in two or more kinds may be also used.

Preferably, the olefin resin may comprise linear low density polyethylene and/or an ethylene-vinyl acetate copolymer.

In this case, it is possible to further improve the good retaining property of a blowing agent in the expandable modified resin beads. In addition, it is possible to further improve the strength of the foamed molded article formed from the expanded modified resin beads obtained by foaming, expanding and molding the above-mentioned expandable modified resin beads.

In addition, examples of the styrene resin constituting the dispersion phase include a polymer of styrene monomers, and a polymer composed of styrene monomers and monomer components copolymerizable with the styrene monomer. As such copolymerizable monomer component, use can be made of, for example, alkyl esters having $C_{1-10}$ acrylic acid such as methyl acrylate, ethyl acrylate, propyl acrylate, butyl acrylate and 2-ethylhexyl acrylate, and the like. In addition, for example, alkyl esters having $C_{1-10}$ methacrylic acid such as methyl methacrylate, ethyl methacrylate, propyl methacrylate, butyl methacrylate and 2-ethylhexyl methacrylate, may be also used. In addition, α-methyl styrene, o-methyl styrene, m-methyl styrene, p-methyl styrene, vinyl toluene, p-ethyl styrene, 2,4-dimethyl styrene, p-methoxystyrene, p-phenyl styrene, o-chlorostyrene, m-chlorostyrene, p-chlorostyrene, 2,4-dichlorostyrene, p-n-butyl styrene, p-t-butyl styrene, p-n-hexyl styrene, p-octyl styrene, styrene sulfonic acid, sodium styrene sulfonate and the like may be used. Furthermore, unsaturated compounds containing a nitrile group such as acrylonitrile and methacrylonitrile, and the like may be used, for example. These monomer components may be copolymerized with a styrene monomer as alone, or in combination of two kinds or more. In the present specification, a styrene monomer and a monomer component copolymerizable with the styrene monomer are called a styrene-based monomer. Specific examples of the styrene resin include polystyrene, rubber-modified polystyrene, an acrylonitrile-butadiene-styrene copolymer, an acrylonitrile-styrene copolymer, an acrylonitrile-ethylene propylene rubber-styrene copolymer and the like. The above-mentioned styrene resin may exist alone, or in two or more kinds.

In a case where a styrene monomer and a monomer component copolymerizable with the styrene monomer are used in combination, the percentage of the mass of a styrene monomer with respect to the total mass of styrene-based monomers in polymerization of the styrene resin is preferably set to 50% or more. In addition, a styrene homopolymer, a copolymer of styrene and an acrylic-based monomer (for example, styrene and butylacrylate), or the like is preferably used from a viewpoint of good expansion property.

In the expandable modified resin beads, the modified resin preferably contains 80 to 50 parts by mass of the styrene resin with respect to 20 to 50 parts by mass of the olefin resin when the total amount of the olefin resin and the styrene resin is assumed as 100 parts by mass.

In a case where the olefin resin is less than 20 parts by mass, or a case where the styrene resin is more than 80 parts by mass, there is a fear that properties of the olefin resin are harmed leading to decrease of toughness, heat resistance, and chemical resistance. On the other hand, in a case where the olefin resin is more than 50 parts by mass, or a case where the styrene resin is less than 50 parts by mass, there is a fear that spheroidizing of beads becomes difficult. In addition, there is a fear that properties of the styrene resin are harmed leading to decrease of mechanical strength. More preferably, the modified resin may contain 75 to 55 parts by mass of the styrene resin with respect to 25 to 45 parts by mass of the olefin resin, and further preferably, the modified resin may contain equal to or less than 75 parts by mass, and more than 65 parts by mass of the styrene resin, with respect to 25 parts by mass or more, and less than 35 parts by mass of the olefin resin, from a viewpoint of improvement of expansion property.

Next, the dispersion phase preferably contains a dispersion diameter-enlarging agent that enlarges the volume average diameter of the dispersion phase.

The dispersion diameter-enlarging agent is a thermoplastic resin that has an action of enlarging the volume average diameter of the dispersion phase formed in the continuous phase by being added. Consequently, whether or not a thermoplastic resin corresponds to the dispersion diameter-enlarging agent, can be learned by measuring and comparing the volume average diameters with the method described above for expandable modified resin beads prepared by addition of the thermoplastic resin, and expandable modified resin beads prepared without addition of the thermoplastic resin, but in the same composition for other resins, and the same polymerization conditions as those of the expandable modified resin beads prepared with addition of the thermoplastic resin. Specifically, in a case where the volume average diameter of a dispersion phase containing a styrene resin as a major component in expandable modified resin beads, which are prepared with addition of the certain amount of the thermoplastic resin, is large in comparison with expandable modified resin beads prepared without addition of the thermoplastic resin, the thermoplastic resin corresponds to the dispersion diameter-enlarging agent.

Specifically, examples of the dispersion diameter-enlarging agent include, for example, the thermoplastic resins described below.

Specifically, the dispersion diameter-enlarging agent is different from the major component of the dispersion phase, and examples thereof include one kind selected from an acrylonitrile-styrene copolymer, a methyl methacrylate-styrene copolymer, polystyrene, a styrene-based elastomer, rubber modified polystyrene, an ABS resin, an AES resin, polyvinyl chloride, polyvinylidene chloride and the like, or a mixture of two or more kinds thereof.

Preferably, the dispersion diameter-enlarging agent may comprise at least one kind selected from a styrene resin different from the major component of the dispersion phase, a styrene-butadiene-styrene block copolymer, a styrene-isoprene-styrene block copolymer, a styrene-based elastomer such as a hydrate of these block copolymers, and a vinyl chloride resin such as polyvinyl chloride and polyvinylidene chloride.

When nuclear particles comprising the olefin resin containing the dispersion diameter-enlarging agent are impregnated with styrene-based monomers and they are polymerized, the polymerization temperature may be adjusted to 60° C. to 85° C. or an amount of a polymerization initiator may be adjusted to 0.05 to 0.5 parts by mass with respect to 100 parts by mass of the styrene-based monomers whereby to control the polymerization rate, and thus prolong the time in which the styrene-based monomer gathers at the dispersion diameter-enlarging agent. This can lead to control of the volume average diameter of the dispersion phase to increase. As a result, it is possible to sufficiently improve the retaining property of the physical blowing agent in the expandable modified resin beads.

The melt mass flow rate (MFR (200° C., 5 kgf)) of the dispersion diameter-enlarging agent is preferably 1 g/10 min to 500 g/10 min, and more preferably 2 g/10 min to 200 g/10 min from a viewpoint of exhibition of good dispersion property in the nuclear particles as described below.

By setting the melt mass flow rate of the dispersion diameter-enlarging agent to the range, it is possible to suppress dissipation of the blowing agent in the expandable modified resin beads, and thus effects of further improving the retaining property of the blowing agent can be expected.

Measurement of MFR (200° C., 5 kgf) of the dispersion diameter-enlarging agent may be performed as described below.

First, the dispersion diameter-enlarging agent (a thermoplastic resin) is subjected to a load of 5,000 g at a temperature of 200° C. and the dispersion diameter-enlarging agent is extruded from a die (2.09 mm internal diameter, 8.00 mm length) using a melt indexer (for example, Type L203, manufactured by TAKARA KOGYO CO., LTD.). Then, the weight of the dispersion diameter-enlarging agent flown out of the die for 10 minutes is measured, and this is assumed as MFR (200° C., 5 kgf).

In addition, as the dispersion diameter-enlarging agent, an acrylonitrile-styrene copolymer is more preferably used.

In a case where an acrylonitrile-styrene copolymer is used, the melt mass flow rate (MFR (200° C., 5 kgf)) is preferably 1 g/10 min to 20 g/10 min, and more preferably 2.5 g/10 min to 15 g/10 min from a viewpoint of the dispersion property described above.

In addition, in a case where an acrylonitrile-styrene copolymer is used as the dispersion diameter-enlarging agent, a weight average molecular weight thereof is preferably 50,000 to 150,000, and more preferably 60,000 to 120,000.

If the weight average molecular weight is more than 150,000, there is a fear that effects of improving the retaining property of the blowing agent by suppressing dissipation of the blowing agent of the acrylonitrile-styrene copolymer itself, become less. On the other hand, in a case where the weight average molecular weight is less than 50,000, there is a fear that clogging easily occurs at the dies, and good nuclear particles cannot be prepared when the nuclear particles described below are prepared.

The weight average molecular weight in the present specification is measured by a gel permeation chromatography (GPC) method (mix gel column for measurement of a polymer) using polystyrene as a standard substance. Specifically, the measurement can be performed using a measurement device manufactured by Hitachi, Ltd. under measurement conditions of elution liquid: tetrahydrofuran (THF), flow rate: 2 mL/minute, detector: UV 220 nm, and column: GL-R400M×two manufactured by Hitachi Chemical Co., Ltd.

Next, the dispersion diameter-enlarging agent preferably comprises a thermoplastic resin having a solubility parameter of (SP value) 15 $MPa^{1/2}$ to 25 $MPa^{1/2}$.

The SP value of the dispersion diameter-enlarging agent within the above-mentioned range is preferable from a viewpoint of moderate compatibility with an olefin resin constituting nuclear particles, and effects of improving the retaining property of the blowing agent.

The SP value of the dispersion diameter-enlarging agent is a value calculated with an estimation method of Small by the following formula (1). The unit of the SP value calculated from the following formula (1) is $(cal/cm^3)^{1/2}$, and thus the unit is converted to $MPa^{1/2}$.

$$SP\ value = \rho \times \Sigma Fs/M \qquad (1)$$

($\Sigma$: density (g/cm$^3$), M: molecular weight (g/mol), Fs: Small's fixed number (refer to Table 1))

TABLE 1

| Group | Fs (cal$^{1/2}$cm$^{-3/2}$) |
|---|---|
| CH$_3$ | 214 |
| —CH$_2$— | 133 |
| CH$_2$= | 190 |
| CH— | 28 |
| —CH(CH$_3$)$_2$ | 456 |
| —CH= | 111 |
| —C— | −93 |
| C= | 19 |
| CHC— | 285 |
| —C≡C— | 222 |
| —CH=CH$_2$— | 301 |
| Phenyl | 735 |
| Cyclohexyl | — |
| Phenylene (o, m, p) | 658 |
| Naphthyl | 1146 |
| Five-membered ring | 105-115 |
| Six-membered ring | 95-105 |
| Conjugation | 20-30 |
| NO$_3$ (nitrates) | 440 |
| NO$_2$ (aliphatic nitro) | 440 |
| H | 80-100 |
| OH | — |
| O (ether) | 70 |
| CHO | 355-375 |
| CO (ketone) | 275 |
| COOH | 390-410 |
| COO (ester) | 310 |
| CH$_3$COO | 524 |
| CN | 410 |

TABLE 1-continued

| Group | Fs (cal$^{1/2}$cm$^{-3/2}$) |
|---|---|
| Cl (mean) | 260 |
| Cl (single) | 270 |
| Cl (as in CCl$_2$) | 260 |
| Cl (as in CCl$_3$) | 250 |
| Br (single) | 340 |
| I (single) | 425 |
| CF$_2$ (n-hydrocarbons) | 150 |
| CF$_3$ (n-hydrocarbons) | 270 |
| S (sulfides) | 225 |
| SH (thiols) | 315 |
| PO$_4$ (organic phosphates) | 500 |

In the expandable modified resin beads, the content of the dispersion diameter-enlarging agent in the modified resin is preferably 1 to 10 parts by mass, and more preferably 3 to 7 parts by mass with respect to 100 parts by mass of the olefin resin.

If the content of the dispersion diameter-enlarging agent is within the above-mentioned range, it becomes easy to sufficiently increase the volume average diameter of the dispersion phase, and it is possible to improve sufficiently the retaining property of the blowing agent in the expandable modified resin beads. The above-mentioned range is preferable also from a viewpoint that it is possible to maintain good toughness and strength of the foamed molded article formed from the expanded modified resin beads obtained by foaming and expanding the expandable modified resin beads and molding them in a mold.

Next, the expandable modified resin beads contain a physical blowing agent.

The blowing agent is preferably an organic-based physical blowing agent having usually 80° C. or less of the boiling point.

As the organic-based physical blowing agent having 80° C. or less of the boiling point, use can be made of a saturated hydrocarbon compound such as methane, ethane, propane, n-butane, isobutane, cyclobutane, n-pentane, isopentane, neopentane, cyclopentane, n-hexane and cyclohexane, a lower alcohol such as methanol and ethanol, an ether compound such as dimethyl ether and diethyl ether, and the like. These blowing agents may be used alone, or in a mixture of two or more kinds.

The physical blowing agent preferably comprises a $C_{4-6}$ hydrocarbon, and contains at least one kind selected from isobutane, n-pentane and isopentane in 20 parts by mass or more with respect to 100 parts by mass of the total amount of the above-mentioned physical blowing agent.

In this case, it is possible to render the expandable modified resin beads to be sufficiently impregnated and retained with the physical blowing agent.

In addition, the content of the physical blowing agent is preferably 5 to 30 parts by mass with respect to 100 parts by mass of the modified resin.

In this case, it is possible to improve expansion property of the expandable modified resin beads, and to prevent shrinkage at the time of the expansion. Furthermore, it is possible to improve fusion of expanded modified resin beads obtained after the expansion to each other at the time of molding the above-mentioned expanded modified resin beads in a mold, and to improve size stability of a foamed molded article formed from the expanded modified resin beads. More preferably, the content of the physical blowing agent is 10 to 20 parts by mass.

Next, the expandable modified resin beads preferably satisfy a relationship of 1.25 V<V$_0$, wherein V (g/hour) represents a blowing agent-decrease rate of the expandable modified resin beads containing the dispersion diameter-enlarging agent, and $V_0$ (g/hour) represents a blowing agent-decrease rate of the expandable modified resin beads not containing the dispersion diameter-enlarging agent. In this case, the expandable modified resin beads can exhibit excellent retaining property of the blowing agent. More preferably, the expandable modified resin beads satisfy a relationship of $1.75 V < V_0$, and further preferably $2.00 V < V_0$.

The relationship of the blowing agent-decrease rates may be adjusted, for example, by selecting a suitable dispersion diameter-enlarging agent, or by adjusting polymerization temperature or an amount of a polymerization initiator at the time of the polymerization whereby to control the polymerization rate, and the like.

The blowing agent-decrease rate can be measured as described below.

Specifically, expandable modified resin beads are left at a temperature of 23° C. in a condition of open to the outside air for 24 hours or more, and the content of a physical blowing agent in the expandable modified resin beads are measured every predefined time. The expandable modified resin beads are dissolved in dimethylformamide, and the content (% by mass) of a physical blowing agent can be measured with gas chromatography.

The analysis conditions for the gas chromatography are, for example, as described below.

Device used: gas chromatography GC-8A manufactured by Shimadzu Corporation

Column material: glass column having 3 mm internal diameter and 4000 mm length

Column filler: [Liquid phase name] DOP-B, [Impregnation rate of liquid phase] 30 weight %, [Carrier name] Chromosorb P, diatomaceous earth for gas chromatography, [Particle size of carrier] 60/80 mesh, [Method of treating carrier] AW (acid treatment)

Inlet temperature: 100° C.

Column temperature: 50° C.

Detection part temperature: 100° C.

Carrier gas: $N_2$, flow rate 50 m/min.

Detector: FID (hydrogen flame ionization detector)

Quantitative determination: internal standard method

The relationship of the content of the physical blowing agent with time (0-24 hours) is plotted into a graph, and the blowing agent-decrease rate can be calculated from the gradient. Specifically, as the physical blowing agent, a mixture of 20% by volume of n-butane and 80% by volume of isobutane is used, and the relationship of the content of the physical blowing agent of the expandable modified resin beads with time is plotted into a graph wherein the content of the physical blowing agent (% by mass) is on the vertical axis and the time (minute) is on the horizontal axis. The value on the horizontal axis corresponding to a point where the content of the physical blowing agent is 5% by mass in the curve on the graph is set to 0 minute, and the contents (% by mass) of the physical blowing agent of the expandable modified resin beads after 1440 minutes, i.e., after 24 hours from the 0 minute, are read from the curve on the graph. On the basis of the content (% by mass) of the physical blowing agent of the expandable modified resin beads after 24 hours calculated as described above, and the average weight (g) of the modified resin beads used in the measurement, the blowing agent-decrease rate (g/hour) can be calculated with (5 (% by mass)−the content (% by mass) of the physical blowing agent of the expandable modified resin beads after 24 hours)×average weight (g) of modified resin beads/24 (hours). The average weight of the modified resin beads is a value calculated by dividing the mass (g) of the group of 500 or more resin beads used in the measurement, by the resin beads number of the group of the resin beads. In addition, the ratio of the blowing agent-decrease rates specified with V and $V_0$ mentioned above, is applied to those of which the average weight of the modified resin beads is 0.0001 to 0.01 g/bead, further 0.0005 to 0.005 g/bead, particularly 0.001 to 0.003 g/bead.

In the expandable modified resin beads, in a case where the physical blowing agent contained in the expandable modified resin beads is different from the physical blowing agent (a mixture of 20% by volume of n-butane and 80% by volume of isobutane) used at the time of the measurement of the blowing agent-decrease rate, the blowing agent-decrease rate is measured for those adjusted by carrying out operations of dissipating the different physical blowing agent completely, and then impregnating the modified resin beads again with 5% by mass or more of the physical blowing agent. In addition, even in a case where the physical blowing agent of the expandable modified resin beads does not reach 5% by mass, adjustment by carrying out the operation of additionally impregnating the modified resin beads with the physical blowing agent is carried out, and the blowing agent-decrease rate can be measured as described above.

Next, the expandable modified resin beads can be prepared, for example, as described below.

Specifically, first, nuclear particles containing an olefin resin are suspended in an aqueous medium containing, for example, a suspension agent, a surfactant, and an aqueous polymerization inhibitor, whereby to prepare a suspension. Then, a styrene-based monomer is added to the suspension, and impregnated into the nuclear particles and polymerization of the monomers is carried out. Then, during or after the polymerization, resin beads (nuclear particles or modified resin beads) are impregnated with a physical blowing agent. As described above, the expandable modified resin beads can be manufactured.

As the olefin resin used in the nuclear particles, the olefin resin constituting the continuous phase described above may be adopted. The olefin resin preferably comprises linear low density polyethylene and/or an ethylene-vinyl acetate copolymer from a viewpoint of good retaining property of the blowing agent and strength.

In addition, the dispersion diameter-enlarging agent is preferably contained in the nuclear particles.

As the linear low density polyethylene, those having a linear long chain comprising a polyethylene chain and a $C_{2-6}$ (carbon number 2 to 6) short chain branched from the long chain are preferable. Specifically, for example, there are ethylene-α olefin copolymers and the like.

The density of linear low density polyethylene is usually 0.88 to 0.95 g/cm³, but preferably linear low density polyethylene having 0.94 g/cm³ or less of the density, and more preferably linear low density polyethylene having 0.93 g/cm³ or less of the density may be used. In this case, it becomes possible to further reduce the molding pressure when the foamed molded article formed from the expanded modified resin beads is manufactured by molding in a mold.

In addition, the melt mass flow rate (MFR (190° C., 2.16 kgf)) of linear low density polyethylene is preferably 1.5 to 4.0 g/10 minute, more preferably 1.5 to 3.0 g/10 minute from a viewpoint of extrusion competence at the time of the manufacturing of the nuclear particles. A method of measuring MFR (190° C., 2.16 kgf) can be adopted in the same manner as measurement of MFR (200° C., 5 kgf) of the dispersion phase enlarging agent except that the measurement temperature is changed to 190° C., and the load is changed to 2.16 kgf.

In addition, Vicat softening temperature of linear low density polyethylene is preferably 80 to 120° C., more preferably 90 to 100° C. from a viewpoint of good retaining property of the blowing agent in the expandable modified resin beads. Measurement of Vicat softening temperature in the present specification is a value using a test specimen without annealing treatment measured with a method of JIS K7206: 1999 measurement condition A50, wherein the test specimen is prepared to 20 mm length×20 mm width×3 mm thickness from resin pellets using a heating press machine.

In addition, the ethylene-vinyl acetate copolymer is a polymer obtained by copolymerization of ethylene and vinyl acetate, for example, by high pressure radical polymerization and the like. A ethylene-vinyl acetate copolymer generally has a long chain comprising a polyethylene chain, and a vinyl acetate-derived short chain branched from the long chain.

The content of vinyl acetate in the ethylene-vinyl acetate copolymer, i.e., the percentage of vinyl acetate monomer-derived structure unit in the copolymer is generally 1 to 45% by mass, preferably 3 to 20% by mass, and more preferably 5 to 15% by mass.

In a case where the percentage of vinyl acetate is too small, tension break stress of foamed molded article formed from expanded beads obtained from the expandable modified resin beads tends to decrease. On the other hand, in a case where the percentage of vinyl acetate is too large, there is a fear that it negatively affects the retaining property of the blowing agent in the expandable modified resin beads.

The density of the ethylene-vinyl acetate copolymer is usually 0.90 to 0.96 g/cm$^3$, but preferably 0.95 g/cm$^3$ or less, and more preferably 0.94 g/cm$^3$ or less of the ethylene-vinyl acetate copolymer is adopted from a viewpoint of improvement of expansion property and moldability.

In addition, the melt mass flow rate (MFR: 190° C., 2.16 kgf) of the ethylene-vinyl acetate copolymer is preferably 1.5 to 4.0 g/10 minute, and more preferably 2.0 to 3.5 g/10 minute, from a viewpoint of extrusion competence at the time of the manufacturing of the nuclear particles.

In addition, Vicat softening temperature of the ethylene-vinyl acetate copolymer is preferably 60 to 110° C., and more preferably 60 to 90° C. from a viewpoint of particle diameter uniformity at the time of the manufacturing of the nuclear particles.

The nuclear particles preferably contain a linear low density polyethylene and an ethylene-vinyl acetate copolymer as the olefin resin, and preferably contains 60% to 80% by mass of the linear low density polyethylene and 20% to 40% by mass of the ethylene-vinyl acetate copolymer with respect to 100% by mass of the total amount thereof. In this case, expandable modified resin beads maintains good retaining property of a blowing agent, and expanded beads and a foamed molded article formed from the expanded beads obtained from the resin beads exhibit particularly excellent bending deflection.

The dispersion diameter-enlarging agent may be contained in the nuclear particles as described above. The dispersion diameter-enlarging agent is involved in increase of the volume average diameter of the dispersion phase when styrene-based monomers are impregnated into the nuclear particles and polymerized whereby to form a dispersion phase comprising a styrene resin.

The nuclear particles may contain an additive such as a foam cell size adjusting agent, a pigment, a slip agent, an antistatic agent, and a flame retardant as long as the above-described effects are not harmed.

The nuclear particles can be manufactured by blending the olefin resin and favorably the dispersion diameter-enlarging agent, and granulating them finely after melt kneading them. The melt kneading may be performed with an extrusion machine. At this time, each resin component is preferably mixed previously, and then extrusion is carried out in order to carry out uniform kneading. Mixing of each resin component may be performed using a mixer such as, for example, a Henschel mixer, a ribbon blender, a V blender, and a Loedige mixer.

In addition, the dispersion diameter-enlarging agent is preferably dispersed uniformly in the olefin resin of the nuclear particles in order to obtain the expandable modified resin beads that are improved in retaining property of the blowing agent and expansion moldability. This will allow a foamed molded article formed from expanded beads to exhibit bending deflection, which is characteristic of an olefin resin, and also has excellent mechanical strength. Therefore, the melt kneading is preferably carried out using a high dispersion type screw or biaxial extrusion machine such as, for example, Dulmadge type, Maddock type, and mini-melt type.

The dispersion diameter of the dispersion diameter-enlarging agent dispersed in the olefin resin of the nuclear particles is preferably 10 to 1000 nm, and more preferably 10 to 500 nm.

In addition, to the nuclear particles, the foam cell size adjusting agent may be added to adjust the foam cell size of the expanded modified resin beads after the expansion.

As the foam cell size adjusting agent, for example, use can be made of organic substances such as higher fatty acid bisamide and higher fatty acid metal salt, or inorganic substances and the like.

In a case where the organic substance as the foam cell size adjusting agent is used, a blending amount thereof is preferably in a range of 0.01 to 2 parts by mass with respect to 100 parts by mass of the resin for the nuclear particles.

In addition, in a case where the inorganic substance is used, a blending amount thereof is preferably in a range of 0.1 to 5 parts by mass with respect to 100 parts by mass of the resin for the nuclear particles.

In a case where the addition amount of the foam cell size adjusting agent is too small, there is a fear that sufficient effects of reducing the foam cell size may not be obtained. On the other hand, in a case where the addition amount is too large, there is a fear that the foam cell size becomes extremely small, foam cells of expanded beads are destroyed at the time of being molded in a mold and the appearance of the foamed molded article becomes worse.

Miniaturization of the nuclear particles may be performed by strand cut method, hot cut method, and underwater cut method or the like after melt kneading the resin with the extrusion machine. Other methods may be also performed if they give a desired diameter of particles.

The particle diameter of the nuclear particles is preferably 0.1 to 3.0 mm, and more preferably 0.3 to 1.5 mm. In a case where the particle diameter is less than 0.1 mm, there is a fear that the particle diameter of the modified resin beads obtained by impregnation and polymerization with the styrene-based monomers becomes small and the retaining property of the blowing agent decreases. On the other hand, in a case where the particle diameter is more than 3.0 mm, there is a fear that the particle diameter of the obtained expanded beads increases as the particle diameter of modified resin beads increases, and the expanded beads are not efficiently charged into a mold for molding. In addition, in a case where an extrusion machine is used, adjustment of the particle diameter may be performed, for example, by extruding a resin from an opening having a diameter in a range of the particle diameter, and cutting it to a length in a certain range of the particle diameter by changing the cutting speed.

The particle diameter of the nuclear particles can be measured, for example, as described below.

Specifically, the nuclear particles are observed by a microscopic photograph, and for 200 or more of the nuclear particles, each maximum diameter of the nuclear particles is measured, and the arithmetic average value of measured maximum diameters is assumed as the particle diameter of the nuclear particles.

The nuclear particles are usually formed into a suspension by being suspended in an aqueous medium. Dispersion in an aqueous medium may be performed, for example, using a closed pressure vessel having a stirrer. As the aqueous medium, for example, deionized water and the like are exemplified.

The nuclear particles are preferably dispersed along with a suspension agent in an aqueous medium.

As the suspension agent, use can be made of, for example, microparticular inorganic suspension agents such as tricalcium phosphate, hydroxyapatite, magnesium pyrophosphate, magnesium phosphate, aluminum hydroxide, ferric hydroxide, titanium hydroxide, magnesium hydroxide, barium phosphate, calcium carbonate, magnesium carbonate, barium carbonate, calcium sulfate, barium sulfate, talc, kaolin, and bentonite. In addition, for example, organic suspension agents such as polyvinyl pyrrolidone, polyvinyl alcohol, ethyl cellulose, and hydroxypropylmethyl cellulose may be also used. Preferably, the suspension agent is tricalcium phosphate, hydroxyapatite, or magnesium pyrophosphate. These suspension agents may be used as alone, or in combination of two or more kinds.

Use amount of the suspension agent is preferably 0.05 to 10 parts by mass in the solid content with respect to 100 parts by mass of an aqueous medium of the suspension-polymerization system (water of the slurry containing the reaction product). The use amount of the suspension agent is more preferably 0.3 to 5 parts by mass. In a case where the use amount of the suspension agent is too small, there is a fear that it becomes difficult to suspend and stabilize styrene-based monomers, and a massive form of the resin is generated. On the other hand, in a case where the use amount of the suspension agent is too large, there is a fear that the manufacturing cost increases, and also the distribution of the particle diameter becomes wide.

In addition, the suspension may be added with a surfactant.

As the surfactant, use can be made of, for example, an anionic surfactant, a non-ionic surfactant, a cationic surfactant, and a zwitterionic surfactant, and the like.

As the anionic surfactant, use can be made of, for example, sodium alkyl sulfonate, sodium alkyl benzenesulfonate, sodium laurylsulfate, sodium α-olefin sulfonate, and sodium dodecylphenyloxide disulfonate and the like.

As the non-ionic surfactant, use can be made of, for example, polyoxyethylene dodecyl ether, polyoxyethylene nonylphenyl ether, polyoxyethylene lauryl ether and the like.

As the cationic surfactant, use can be made of alkyl amine salts such as coconut amine acetate and stearyl amine acetate. In addition, quaternary ammonium such as lauryltrimethyl ammonium chloride and stearyl trimethyl ammonium chloride, and the like may be also used.

As the zwitterionic surfactant, use can be made of alkyl betaines such as lauryl betaine, and stearyl betaine. In addition, alkyl amine oxides such as lauryl dimethylamine oxide may be also used.

The above-described surfactant may be used as alone, or in combination of multiple kinds.

Preferably, the anionic surfactant may be used as the surfactant. More preferably, alkali metal salt (preferably sodium salt) of carbon number 8 to 20 alkyl sulfonate may be used. This can lead to sufficient stabilization of the suspension.

In addition, the suspension may be added with an electrolyte comprising inorganic salts such as, for example, lithium chloride, potassium chloride, sodium chloride, sodium sulfate, sodium nitrate, sodium carbonate and sodium bicarbonate, if necessary.

In addition, an aqueous polymerization inhibitor is preferably added to the suspension in order to obtain a foamed molded article formed from the expanded modified resin beads having excellent toughness and mechanical strength.

As the aqueous polymerization inhibitor, use can be made of, for example, sodium nitrite, potassium nitrite, ammonium nitrite, L-ascorbic acid, citric acid and the like.

The aqueous polymerization inhibitor is hardly impregnated into the nuclear particles, and dissolved in an aqueous medium. Consequently, polymerization of microdroplets of the styrene-based monomers in an aqueous medium, which are not impregnated into the nuclear particles, and the styrene-based monomers in the vicinity of the surfaces of the nuclear particles as being absorbed in the nuclear particles can be suppressed, while polymerization of the styrene-based monomers impregnated into the nuclear particles is performed. Therefore, the amount of a styrene resin on the surface portion of the expandable modified resin beads can be reduced as compared to that of the central part.

The addition amount of the aqueous polymerization inhibitor is preferably 0.001 to 0.1 mass part, and more preferably 0.002 to 0.02 parts by mass with respect to 100 parts by mass of the aqueous medium (which refers to all of water in the system comprising water such as slurry containing the reaction product, and the like). In a case where the aqueous polymerization inhibitor is more than 0.1 parts by mass, there is a fear that residual styrene-based monomers increase, and good foamed molded article formed from the expanded modified resin beads is not obtained.

As the styrene-based monomer impregnated into the nuclear particles, use can be made of the styrene monomer described above, or the styrene monomer and a monomer component that can be copolymerized with the styrene monomer.

In a case where a mixed monomer of the styrene monomer and the monomer component that can be copolymerized with the styrene monomer is adopted, the total addition amount of the styrene monomer and the copolymerizable monomer component impregnated into the nuclear particles (in a case where only styrene monomers are used, the addition amount is the amount of the styrene monomers only) is preferably 50 to 100 parts by mass with respect to 100 parts by mass of the total monomers to be added. More preferably, the total addition amount is 80 to 100 parts by mass, and further preferably 90 to 100 parts by mass.

Preferably, as the monomer impregnated into nuclear particles, styrene and butyl acrylate may be adopted. In this case, butyl acrylate may be contained preferably in 0.5 to 10 parts by mass, and more preferably in 1 to 8 parts by mass, further more preferably in 2 to 5 parts by mass with respect to the total (100 parts by mass) of the expandable modified resin beads.

In addition, in order to polymerize the styrene-based monomers uniformly in the nuclear particles, the styrene-based monomers are impregnated into nuclear particles and are polymerized. In this case, cross-linking may be generated along with polymerization of the styrene-based monomers. A polymerization initiator is used in polymerization of the styrene-based monomers, and if necessary, a cross-linking agent may be used in combination. In addition, when a polymerization initiator and/or a cross-linking agent is used, the polymerization initiator and/or cross-linking agent is preferably previously dissolved in the styrene-based monomers.

In the polymerization process of the styrene-based monomers, there is a case where the "polymerization" in the present specification may encompass "cross-linking" since there is a case where cross-linking of olefins contained in the above-mentioned nuclear particles may occur.

In addition, to the styrene-based monomers, a plasticizer, an oil-soluble polymerization inhibitor, a flame retardant, a dye and the like may be added if necessary.

As the plasticizer, use can be made of, for example, fatty acid esters such as glycerin tristearate, glycerin trioctoate, glycerin trilaurate, sorbitan tristearate, sorbitan monostearate and butyl stearate. In addition, acetylated monoglycerides such as glycerin diacetomonolaurate, oils and fats such as hardened beef fat and hardened castor oil, organic compounds such as cyclohexane and liquid paraffin and the like may be also used.

As the oil-soluble polymerization inhibitor, use can be made of, for example, para-t-butylcatechol, hydroquinone, benzoquinone and the like.

The blend ratio of the nuclear particles comprising an olefin resin to the styrene-based monomers is preferably 20/80 to 50/50, and more preferably 25/750 to 45/55 in a mass ratio of nuclear particles/styrene-based monomer. Further preferably, the blend ratio is 25/75 to less than 40/more than 60.

As the polymerization initiator, use can be made of those used in the suspension-polymerization method of the styrene-based monomers, for example, polymerization initiators that are soluble in a vinyl monomer, and have 50 to 120° C. of the 10 hour half-life decomposition temperature. Specifically, as the polymerization initiator, use can be made of, for example, organic peroxides such as cumene hydroxyperoxide, dicumyl peroxide, t-butylperoxy-2-ethylhexanoate, t-butyl peroxybenzoate, benzoyl peroxide, t-butylperoxyisopropyl carbonate, t-amylperoxy-2-ethylhexyl carbonate, hexyl peroxy-2-ethylhexyl carbonate, and lauroyl peroxide, azo compounds such as azobisisobutyronitrile and the like. These polymerization initiators may be used as one kind or in combination of two kinds or more.

The polymerization initiator may be added by being dissolved in a solvent, and impregnated into the nuclear particles.

As the solvent that dissolves the above-mentioned polymerization initiator, for example, aromatic hydrocarbons such as ethyl benzene and toluene, aliphatic hydrocarbons such as heptane and octane, and the like are used.

The polymerization initiator is preferably used in 0.01 to 3 parts by mass with respect to 100 parts by mass of the styrene-based monomers.

In addition, as the cross-linking agent, use can be made of cross-linking agents that are not decomposed at polymerization temperature, and decomposed at cross-linking temperature, and have 10 hour half-life decomposition temperature that is higher than polymerization temperature by 5° C. to 50° C. Specifically, as the cross-linking agent, use can be made of peroxides such as, for example, dicumyl peroxide, 2,5-t-butylperbenzoate and 1,1-bis-t-butylperoxycyclohexane. The cross-linking agent may be used alone or in combination of two kinds or more. The blending amount of the cross-linking agent is preferably 0.1 to 5 parts by mass with respect to 100 parts by mass of the styrene-based monomers.

As the polymerization initiator and the cross-linking agent, identical compounds may be also adopted.

In addition, to the styrene-based monomer or the solvent, a foam cell size adjusting agent may be added.

As the foam cell size adjusting agent, use can be made of, for example, aliphatic monoamide, fatty acid bisamide, talc, silica, polyethylene wax, methylene bisstearic acid, a methyl methacrylate-based copolymer, and silicone, and the like. As the aliphatic monoamide, for example, use can be made of oleic acid amide, and stearic acid amide and the like. As the fatty acid bisamide, for example, use can be made of ethylene bisstearic acid amide and the like.

The foam cell size adjusting agent is preferably used in 0.01 to 2 parts by mass with respect to 100 parts by mass of the styrene-based monomers.

The addition of the styrene-based monomers (if necessary, containing a polymerization initiator and/or cross-linking agent in the monomers), which are added when the styrene-based monomers are impregnated into the nuclear particles and polymerized, may be performed at one time or may be performed in several times.

The polymerization temperature varies depending on the kind of a polymerization initiator to be used, but is preferably 60 to 105° C. In addition, the cross-linking temperature varies depending on the kind of a cross-linking agent to be used, but is preferably 100 to 150° C.

Impregnation of the physical blowing agent may be performed during polymerization or after polymerization of the styrene monomers.

Specifically, the physical blowing agent is pressed into a vessel accommodating the resin beads during the polymerization or after the polymerization, and impregnated into the resin beads.

The impregnation temperature of the blowing agent is preferably in a range of the glass transition temperature (Tg) (° C.) of a styrene resin (a styrene homopolymer, a copolymer of a styrene monomer and a monomer component copolymerizable with the styrene monomer) to Tg+40 (° C.), and more preferably in a range of Tg+5 (° C.) to Tg+25(° C.).

In a case where the impregnation temperature of the blowing agent is too low, there is a fear that the initial content of the blowing agent becomes large. As a result, in a case where the expandable modified resin beads are foamed and expanded after they are stored or transported under atmosphere of ambient temperature or more, there is a fear that the retaining property of the blowing agent becomes insufficient, although immediate expansion has no problem. This is presumed to be due to the fact that the physical blowing agent is impregnated into the continuous phase comprising an olefin resin, which is easy to be impregnated (with the physical blowing agent), and the physical blowing agent is not sufficiently impregnated into the dispersion phase comprising a styrene resin in the modified resin beads, and the physical blowing agent comes out from the continuous phase from which the physical blowing agent is easy to dissipate. In addition, this tendency becomes remarkable in a case where the volume average diameter of the dispersion phase is large (=total surface area is small) in the modified resin beads. On the other hand, in a case where the impregnation temperature is too high, resin beads tend to easily become flat.

The glass transition temperature (Tg) of the styrene resin can be measured, for example, as described below.

Specifically, first, to a flask accommodating 200 mL xylene, 1.0 g of the expandable modified resin beads are added, and the xylene solution is heated with a mantle heater for 8 hours, and soxhlet extraction is carried out. The extraction xylene solution is dropped to 600 mL acetone, and decantation and evaporation to dryness under reduced pressure are carried out, whereby to give a styrene resin as acetone solubles. For 2 to 4 mg of the obtained styrene resin, heat flux differential scanning calorie measurement is carried out in accordance with JIS K7121 (1987) using 2010 type DSC instrument manufactured by TA Instruments. Then, the glass transition temperature can be measured as the middle point of the DSC curve obtained under conditions of 10° C./minute heating rate.

In addition, after impregnation of the physical blowing agent, the expandable modified resin beads are dehydrated to dryness, and if necessary, may be coated with a surface coating agent.

As the surface coating agent, for example, there are zinc stearate, stearic acid triglyceride, stearic acid monoglyceride, castor hardened oil, an antistatic agent and the like. The addition amount of the surface coating agent is preferably 0.01 to 2 parts by mass with respect to 100 parts by mass of the expandable modified resin beads.

The expandable modified resin beads are foamed and expanded by being heated in a heating medium, whereby to give the expanded modified resin beads. Specifically, the expandable modified resin beads can be foamed and expanded by supplying a heating medium such as steam to the expandable modified resin beads. The bulk density of the obtained expanded modified resin beads is preferably 10 to 200 kg/m$^3$, and further preferably 20 to 100 kg/m$^3$.

In addition, molding of the expanded modified resin beads in a mold with a well-known molding method can give a foamed molded article (the above-mentioned foamed molded article formed from the expanded modified resin beads). The density of the obtained foamed molded article formed from the expanded modified resin beads is preferably 10 to 200 kg/m$^3$, and further preferably 20 to 100 kg/m$^3$.

EXAMPLES

Example 1

Examples will be explained as follows.

In the present example, expandable modified resin beads are prepared, and using them, expanded modified resin beads, and a foamed molded article formed from the expanded modified resin beads are manufactured.

FIG. 1 schematically illustrates the cross-sectional structure of the modified resin that constitutes the inside of the expandable modified resin beads of the present example. As illustrated in the same figure, expandable modified resin beads 1 have a modified resin as a base resin, which is obtained by dispersion of a dispersion phase 3 containing a styrene resin as a major component in a continuous phase 2 containing an olefin resin as a major component, and contain a physical blowing agent.

Hereinafter, a method of preparing the expandable modified resin beads of the present example will be explained.

(1) Preparation of Nuclear Particles

5 Kg of ethylene-vinyl acetate copolymer (EVA, trade name: "Ultrathene 626", manufactured by TOSOH CORPORATION) containing 15% by mass of vinyl acetate, 15 kg of a linear low density polyethylene (LLDPE, trade name: "NIPOLON 9P51A", manufactured by TOSOH CORPORATION), and 1 kg of acrylonitrile-styrene copolymer (AS, trade name: "AS-XGS", manufactured by DENKI KAGAKU KOGYO KABUSHIKI KAISHA, weight average molecular weight: 109,000, MFR (200° C., 5 kgf): 2.8 g/10 min, SP value: 20.0 MPa$^{1/2}$) as a dispersion diameter-enlarging agent were put into a Henschel mixer (trade name: Type FM-75E, manufactured by MITSUI MIIKE MACHINERY Co., Ltd), and mixed for 5 minutes. The blending ratio of each resin component is illustrated in Table 2 described below.

Then, this resin mixture was melt-kneaded with an extrusion machine (trade name: Type MS50-28, inside diameter: 50 mm monoaxial extrusion machine, Maddock type screw, manufactured by IKG Corporation) at a temperature of 230 to 250° C., and cut to 0.4 to 0.6 mg/piece (average 0.5 mg/piece) by underwater cut method, whereby to give nuclear particles composed of polyethylene-based resins.

(2) Preparation of Expandable Modified Resin Beads

To an autoclave having 3 L internal volume and being equipped with a stirrer, 980 g of deionized water was put, and 7.5 g of sodium pyrophosphate was further added thereto, and then 15 g of powder form magnesium nitrate hexahydrate was added, and the mixture was stirred at room temperature for 30 minutes. By this, a slurry of magnesium pyrophosphate as a suspension agent was prepared.

Next, to this suspension agent, 1.5 g of sodium lauryl sulfonate (10% by mass aqueous solution) as a surfactant, 5.0 g of sodium nitrite (1% by mass aqueous solution) as an aqueous polymerization inhibitor, and 200 g of the nuclear particles were added.

Then, 2.0 g of benzoyl peroxide (trade name: "NYPER BW", water-diluted powder product, manufactured by Nippon Oil & Fats Co., Ltd.) and 0.25 g of t-butylperoxy-2-ethylhexyl mono carbonate (trade name: "perbutylE", manufactured by Nippon Oil & Fats Co., Ltd.) as a polymerization initiator, and 5.1 g of 1,1-di(tertiary butylperoxy)cyclohexane (trade name: "Luperox 331M70", manufactured by ARKEMA YOSHITOMI, LTD.) as a cross-linking agent were dissolved in 353 g of styrene and 17 g of butyl acrylate as a monomer, and the dissolved substance was put into the suspension agent in the autoclave while being stirred at 500 rpm of the stirring rate.

Then, the gas phase portion of the autoclave was replaced with nitrogen gas, and then temperature elevation was initiated, and the temperature was elevated by taking 2 hours to a temperature of 88° C. After the temperature elevation, the temperature was retained at this temperature of 88° C. for 30 minutes, and then the stirring rate was lowered to 450 rpm, and the temperature was cooled to 82° C. of the polymerization temperature by taking 15 minutes. After the cooling, the temperature was retained at this polymerization temperature of 82° C. for 5 hours. The polymerization temperature is listed in Table 2 described below. Then, the temperature was elevated to a temperature of 120° C. by taking 2 hours, and the temperature was retained as it was at a temperature of 120° C. for 5 hours.

Then, the temperature was cooled to a temperature of 90° C. by taking 1 hour, the stirring rate was lowered to 400 rpm, and the temperature was retained at a temperature of 90° C. as it was for 3 hours. Then, at the time when the temperature reached 90° C., 22.9 g cyclohexane and 74.2 g of butane (a mixture of about 20% by volume of n-butane and about 80% by volume of isobutane) as a blowing agent were put into the autoclave by taking about 1 hour. Furthermore, the temperature was elevated to a temperature of 105° C. by taking 2 hours, the temperature was retained at a temperature of 105° C. as it was for 5 hours, and then the temperature was cooled to a temperature of 30° C. by taking about 6 hours.

Figure 2:
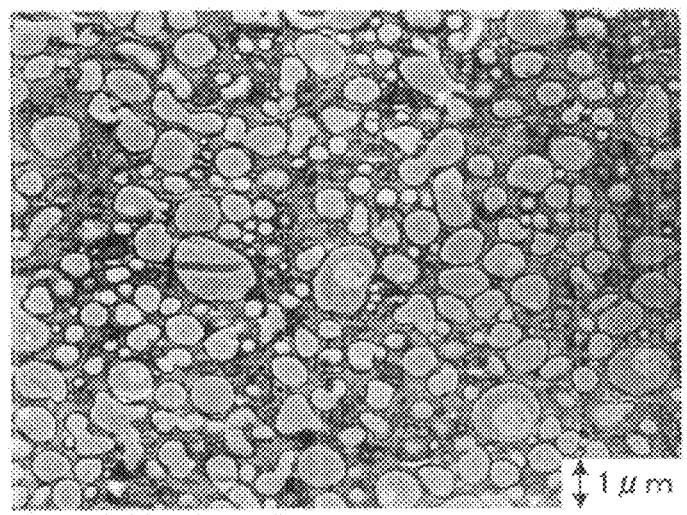
FIG. 2 is a photograph that is a substitution of a drawing, which illustrates results of observations of the central part of the expandable modified resin beads of Example 1 with a transmission electron microscope.

After the cooling, the content was taken out, and magnesium pyrophosphate adhered to the surface of the resin beads was dissolved by adding nitric acid. Then, the resultant was dehydrated and washed with a centrifugal machine, and moisture adhered on the surface was removed with an airflow dryer, whereby to give expandable modified resin beads having an average particle diameter (d63) of about 1.5 mm. A photograph of the central part of the expandable modified resin beads (10,000 times of the enlargement magnification ratio) obtained in the present example with a transmission electron microscope is illustrated in FIG. 2.

The obtained expandable modified resin beads were sieved and beads having 0.7 to 2.0 mm diameter were taken out, and 0.008 parts by mass of N,N-bis(2-hydroxyethyl)alkyl amine are added as an antistatic agent, and further coated with a mixture of 0.12 parts by mass of zinc stearate, 0.04 parts by mass of glycerin monostearate and 0.04 parts by mass of glycerin distearate, with respect to 100 parts by mass of the expandable modified resin beads.

Next, for the expandable modified resin beads obtained as described above, the content of the blowing agent, the percentage taken up by isobutane (iC4), n-pentane (nC5), and isopentane (iC5) (the content of iC4+nC5+iC5) in the blowing agent, the 30° C.-corresponding life, the ratio of the blowing agent-decrease rates $V_0/V$, the volume average diameter of the dispersion phase, and the percentage of the dispersion phase of 0.6 μm$^2$ or more were calculated as described below. In Example 15, the content of iC4+nC5+iC5 is the content of isopentane since iC4 and nC5 are not used. In other Examples, the content of iC4+nC5+iC5 is the content of isobutane since nC5 and iC5 are not used.

"Content of the blowing agent, and content of iC4+nC5+iC5"

The expandable modified resin beads were dissolved in dimethylformamide, and the content (% by mass) of the blowing agent (all components) in expandable modified resin beads were measured with a gas chromatography in the same manner as the method of measuring the blowing agent-decrease rate described above. This is assumed as the content of the blowing agent (C). Furthermore, the content (% by mass) of each component in the blowing agent was measured.

Then, among the contents of each component, the total content (D) of isobutane, n-pentane, and isopentane was calculated. Then, the content of iC4+nC5+iC5(D/C×100) was calculated by dividing this total content by the content of the blowing agent and representing the value in a percentage.

The content of the blowing agent and the content iC4+nC5+iC5 are listed in Table 2 described below.

"30° C.-corresponding life"

100 g of the expandable modified resin beads was put into a 200 mL cup (about 38 cm$^2$ open area), and stored in a condition of open to the outside air at each temperature of 6° C., 23° C., and 40° C. for 24 hours or more. The content of the blowing agent contained in the expandable modified resin beads at each temperature was measured with the method described above. Then, the dissipation rate of the blowing agent was calculated by the method described above.

Next, Arrhenius plot was prepared in which the dissipation rate was on the vertical axis and a reverse number of the storage temperature (absolute temperature) was on the horizontal axis. Based on this, the time in which the amount of the blowing agent is decreased by 10% from its initial stage at a temperature of 30° C. was calculated. This time is assumed as 30° C.-corresponding life (h), and the results are listed in Table 2 described below. The amount of the blowing agent is an amount of $C_{4-6}$ hydrocarbon compounds that are used as a blowing agent, such as n-butane, isobutane, n-pentane, isopentane, neopentane, n-hexane, 2-methylpentane, 3-methylpentane, 2,2-dimethylbutane, 2,3-dimethylbutane, cyclobutane, cyclopentane and cyclohexane.

"Ratio of blowing agent-decrease rates: $V_0/V$"

The blowing agent-decrease rate V is a decrease rate of the blowing agent calculated by the method described above when expandable modified resin beads containing the dispersion diameter-enlarging agent are left in a condition of open to the outside air at 23° C. temperature for 24 hours or more. The blowing agent-decrease rate $V_0$ is a decrease rate of the blowing agent calculated by the method described above when the expandable modified resin beads not containing dispersion diameter-enlarging agent are left in a condition of open to the outside air at 23° C. temperature for 24 hours or more.

The blowing agent-decrease rate V is identical to the dissipation rate of the blowing agent at temperature 23° C. used when the 30° C.-corresponding life described above is calculated, and calculated in the same manner. The initial content of the blowing agent is set to 5% by mass or more.

On the other hand, for the blowing agent-decrease rate $V_0$, first, expandable modified resin beads not containing a dispersion diameter-enlarging agent were prepared. Such expandable modified resin beads were prepared in the same manner as those for the expandable modified resin beads containing a dispersion diameter-enlarging agent except that the dispersion diameter-enlarging agent was not added at the time of preparation of nuclear particles. Next, for the obtained expandable modified resin beads, the dissipation rate of the blowing agent (refer to the 30° C.-corresponding life described above) at 23° C. temperature is calculated, and this is assumed as the blowing agent-decrease rate $V_0$. The ratio of these blowing agent-decrease rates, $V_0/V$ is calculated, and the results thereof are listed in Table 2.

"Volume average diameter of dispersion phase"

A sample for observation was cut out from the central part of the expandable modified resin beads, embedded in an epoxy resin, stained with ruthenium tetraoxide, and then an ultra-thin slice was prepared by an ultra-microtome. This ultra-thin slice was put on a grid, and the morphology of the internal cross-section of the expandable modified resin beads were observed with a transmission electron microscope (trade name: JEM1010, manufactured by JEOL Ltd.) by a magnification of 10,000 times, and a photograph for the cross-section (TEM photograph) was taken.

Next, the photograph for the cross-section was captured with a scanner (600 dpi/color photograph). The captured image was analyzed with an image processing software (trade name: NanoHunter NS2K-Pro, manufactured by NANO System Corporation), the area per one dispersion phase (polystyrene phase) was calculated, and equivalent true circle diameter of an identical area to the area thereof is assumed as the dispersion diameter per one dispersion phase, and the volume average diameter as described above was calculated. The results thereof are listed in Table 2 described below. Processing conditions for calculating the dispersion diameter of the dispersion phase (polystyrene phase) by the image processing software were set to (1) monochrome conversion→(2) smoothing filter (3×3, close to 8, processing time=1)→(3) binarization by NS method (brighter than the background, color definition=100, sensitivity=5, noise removed, concentration range=0 to 255)→(4) blank spaces filling→(5) shrinkage (close to 8, processing time=3)→(6) selection of only an image by a specialized amount (area) (0.01 to ∞μm$^2$, close to 8)→(7) expansion in a way not to be adjacent to the vicinity ones (close to 8, processing time=3)→(8) measurement of equivalent circle diameter (calculated from the area, close to 8).

"Percentage of the Dispersion Phase of 0.6 μm$^2$ or More"

In the same manner as the measurement of the volume average diameter described above, a photograph for the cross-section was taken, and the percentage of the dispersion phase of 0.6 μm$^2$ or more was computed with the method described above.

(3) Preparation of Expanded Modified Resin Beads

Next, using expandable modified resin beads obtained as described above, expanded beads having about 33.3 kg/m³ of the bulk density and expanded beads having about 20 kg/m³ of the bulk density were prepared.

Specifically, first, the expandable modified resin beads obtained as described above were put into a 30 L ambient pressure batch expanding machine, and steam was supplied into this expanding machine. By this, the expandable modified resin beads were foamed and expanded to about 33.3 kg/m³ of the bulk density, and expanded modified resin beads having 30 times of the expansion ratio were obtained.

In addition, the expanded modified resin beads having about 33.3 kg/m³ of the bulk density were aged at room temperature for 3 to 6 hours, and then were put into a 30 L ambient pressure batch expanding machine, and steam was supplied into this expanding machine. By this, the expanded modified resin beads were further foamed and expanded to about 20 kg/m³ of the bulk density, and foamed and expanded modified resin beads having 50 times of the expansion ratio were obtained.

The bulk density (kg/m³) of the foamed and expanded modified resin beads was calculated by preparing a 1 L graduated cylinder, putting expanded modified resin beads to 1 L marked line of the empty graduated cylinder, and measuring the weight of the expanded beads put into the graduated cylinder. The weight of the expanded beads per 1 L bulk volume measured by this operation was unit-converted whereby to calculate the bulk density (kg/m³) of expanded modified resin beads. In addition, the expansion ratio of the expanded beads was calculated at (1000/bulk density (kg/m³)).

(4) Preparation of Foamed Molded Article Formed from the Expanded Modified Resin Beads The expanded modified resin beads obtained as described above was aged at room temperature for 1 day, and then a foamed molded article of 300 mm×75 mm×25 mm cubic form were molded with a molding machine (trade name: VS500, manufactured by DAISEN INDUSTRIAL Co, LTD.). The obtained foamed molded article was dried at a temperature of 40° C. for 1 day, and then further aged at room temperature for 1 day or more.

By such procedures, two kinds of expanded modified resin beads having about 33.3 kg/m³ and about 20 kg/m³ of the bulk density were molded respectively, whereby to give two kinds of the foamed molded article formed from the expanded modified resin beads having 30 times and 50 times of the expansion ratio.

To measure the expansion ratio of the foamed molded article formed from the expanded modified resin beads, the density (kg/m³) of the foamed molded article was calculated by dividing the mass of the foamed molded article by the volume of the foamed molded article, and on the basis of the obtained density, the expansion ratio of the foamed molded article was calculated according to (1000/density (kg/m³)).

Next, for the foamed molded article formed from the expanded modified resin beads, the degree of internal fusion-bonding, the bending strength, and the compression stress were measured as described below.

"Degree of Internal Fusion-Bonding"

First, a test specimen of 150 mm (length)×75 mm (width)×25 mm (thickness) was cut out from the foamed molded article, and an incision of 2 mm depth was made on one surface (one surface having 150 mm length and 75 mm width) in the central part in the length direction in a way to traverse the total width, and this is used as a test specimen. Then, the test specimen was folded in a direction along which the incision is broaden, until the test specimen is fractured, or until the both ends of the test specimen abut.

Next, the fracture section of the test specimen was observed, and the number of expanded beads which are fractured in their inner portions, and the number of expanded beads which are peeled off in their boundary faces were counted visually, respectively. Then, the percentage of the internally fractured expanded beads with respect to the total number of the internally fractured expanded beads and the expanded beads peeled off in their boundary faces, was calculated, and this was assumed as the degree of internal fusion-bonding (%) indicated as the percentage. The results thereof are listed in Table 2 described below.

The fusion rate when the test specimen is not fractured, is assumed as 100%.

"Maximum Bending Strength"

The 3 points bending test (200 mm span) was carried out in accordance with JIS K 7221-2 (2006), and the maximum bending strength (MPa) was measured. Similar test was performed for 5 test specimens, and average maximum bending strength (MPa) was calculated. The results thereof are listed in Table 2 described below.

"Compression Stress"

A test specimen having 50 mm length, 50 mm width and 25 mm thickness was cut out from the foamed molded article, and a compression test was carried out in accordance with JIS K 7220 (2006). The compression stress at the time when the compression distortion was 10%, was assumed as 10% deformation compression stress, and the compression stress at the time when the compression distortion was 50%, was assumed as 50% deformation compression stress. The results thereof are listed in Table 2 described below.

Example 2

The present example is an example in which expandable modified resin beads are prepared in the same manner as Example 1 but with change of the kind of the dispersion diameter-enlarging agent, and using the expandable modified resin beads, a foamed molded article formed from the expanded modified resin beads is manufactured.

Specifically, in the present example, expandable modified resin beads were prepared in the same manner as Example 1 except for the point that "GR-AT-5S" (weight average molecular weight: 83,000, MFR (200° C., 5 kgf): 10.3 g/10 min, SP value: 20.0 MPa$^{1/2}$) manufactured by DENKI KAGAKU KOGYO KABUSHIKI KAISHA was used as the acrylonitrile-styrene copolymer (AS) of the dispersion diameter-enlarging agent.

Example 3

The present example is an example in which expandable modified resin beads are prepared in the same manner as Example 1 but with change of the polymerization temperature, and using the expandable modified resin beads, a foamed molded article formed from the expanded modified resin beads is manufactured.

Specifically, expandable modified resin beads were prepared in the same manner as Example 1 except for the point that the gas phase portion of the autoclave was replaced with nitrogen gas in the same manner as Example 1, temperature elevation was initiated and the temperature was elevated by taking 2 hours to a temperature of 88° C., the temperature was retained at this temperature of 88° C. for 30 minutes, the stirring rate was lowered to 450 rpm, the temperature was cooled to a temperature of 65° C. (the polymerization temperature) by taking 1 hour, and the temperature was retained as it was at the polymerization temperature of 65° C. for 12 hours.

Example 4

The present example is an example in which expandable modified resin beads are prepared in the same manner as Example 1 but with change of the kind of the dispersion diameter-enlarging agent and the polymerization temperature, and using the expandable modified resin beads, a foamed molded article formed from the expanded modified resin beads is manufactured.

Specifically, in the present example, "GR-AT-5S" (weight average molecular weight: 83,000, MFR (200° C., 5 kgf): 10.3 g/10 min, SP value: 20.0 MPa$^{1/2}$) manufactured by DENKI KAGAKU KOGYO KABUSHIKI KAISHA was used as the acrylonitrile-styrene copolymer (AS) of the dispersion diameter-enlarging agent.

In addition, in the present example, in the same manner as Example 1, the gas phase portion of the autoclave was replaced with nitrogen gas, temperature elevation was initiated and the temperature was elevated by taking 2 hours to a temperature of 88° C., the temperature was retained at this temperature of 88° C. for 30 minutes, the stirring rate was lowered to 450 rpm, the temperature was cooled to a temperature of 65° C. (the polymerization temperature) by taking 1 hour, and the temperature was retained as it was at the polymerization temperature of 65° C. for 12 hours.

Figure 3:
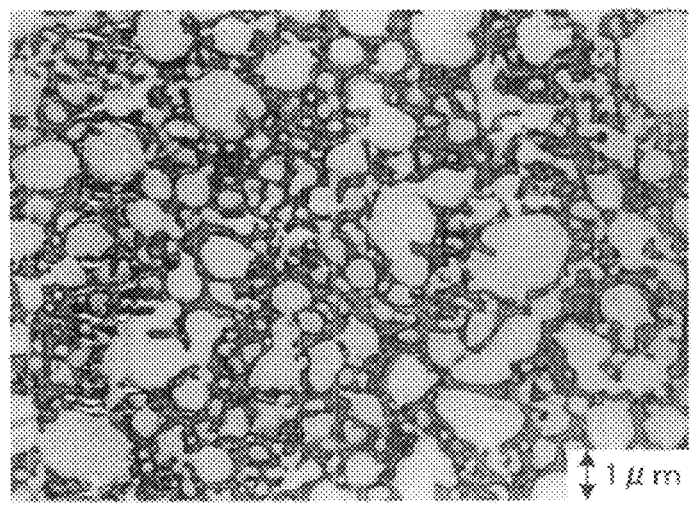
FIG. 3 is a photograph that is a substitution of a drawing, which illustrates results of observations of the central part of the expandable modified resin beads of Example 4 with a transmission electron microscope.

In the present example, expandable modified resin beads were prepared in the same manner as Example 1 except for these points. A photograph of the central part of the expandable modified resin beads prepared in the present example (TEM photograph; 10,000 times of the enlargement magnification ratio) with a transmission electron microscope is illustrated in FIG. 3.

Example 5

The present example is an example in which expandable modified resin beads are prepared in the same manner as Example 1 but with change of the kind of the dispersion diameter-enlarging agent and the polymerization temperature, and using the expandable modified resin beads, a foamed molded article formed from the expanded modified resin beads is manufactured.

Specifically, in the present example, a methyl methacrylate-styrene copolymer (MS: trade name: "MS200" manufactured by Nippon Steel Chemical Co., Ltd., weight average molecular weight: 219,000, MFR (200° C., 5 kgf): 2.2 g/10 min, SP value: 18.3 MPa$^{1/2}$) was used as a dispersion diameter-enlarging agent instead of AS.

In addition, in the present example, in the same manner as Example 1, the gas phase portion of the autoclave was replaced with nitrogen gas, temperature elevation was initiated and the temperature was elevated by taking 2 hours to a temperature of 88° C., the temperature was retained at this temperature of 88° C. for 30 minutes, the stirring rate was lowered to 450 rpm, the temperature was cooled to a temperature of 65° C. (the polymerization temperature) by taking 1 hour, and the temperature was retained as it was at the polymerization temperature of 65° C. for 12 hours.

Figure 4:
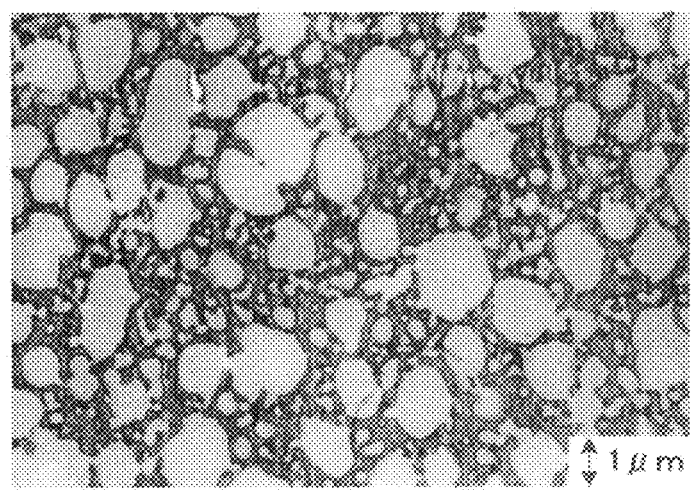
FIG. 4 is a photograph that is a substitution of a drawing, which illustrates results of observations of the central part of the expandable modified resin beads of Example 5 with a transmission electron microscope.

In the present example, expandable modified resin beads were prepared in the same manner as Example 1 except for these points. A photograph of the central part of the expandable modified resin beads prepared in the present example (TEM photograph; 10,000 times of the enlargement magnification ratio) with a transmission electron microscope is illustrated in FIG. 4.

Example 6

The present example is an example in which expandable modified resin beads are prepared in the same manner as Example 1 but with change of the kind of the dispersion diameter-enlarging agent and the polymerization temperature, and using the expandable modified resin beads, a foamed molded article formed from the expanded modified resin beads is manufactured.

Specifically, in the present example, polystyrene (PS: trade name:"679" manufactured by PS Japan Corporation., weight average molecular weight: 169,000, MFR (200° C., 5 kgf): 22.5 g/10 min, SP value: 18.1 MPa$^{1/2}$) was used as a dispersion diameter-enlarging agent instead of AS of Example 1.

In addition, in the present example, in the same manner as Example 1, the gas phase portion of the autoclave was replaced with nitrogen gas, temperature elevation was initiated and the temperature was elevated by taking 2 hours to a temperature of 88° C., the temperature was retained at this temperature of 88° C. for 30 minutes, the stirring rate was lowered to 450 rpm, the temperature was cooled to a temperature of 65° C. (the polymerization temperature) by taking 1 hour, and the temperature was retained as it was at the polymerization temperature of 65° C. for 12 hours.

Figure 5:
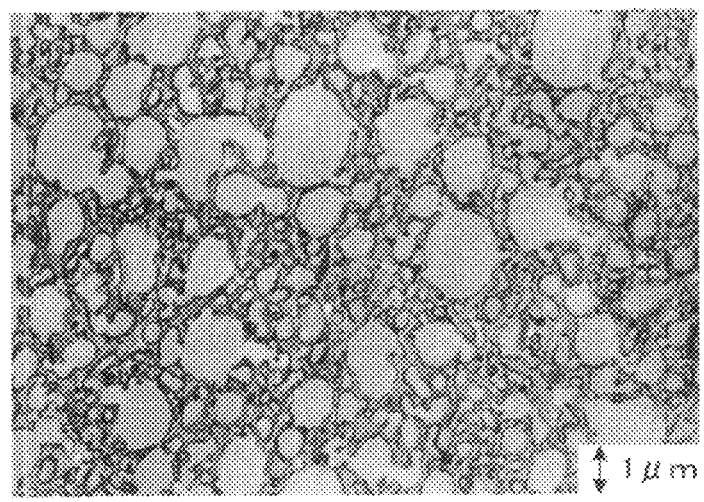
FIG. 5 is a photograph that is a substitution of a drawing, which illustrates results of observations of the central part of the expandable modified resin beads of Example 6 with a transmission electron microscope.

In the present example, expandable modified resin beads were prepared in the same manner as Example 1 except for these points. A photograph of the central part of the expandable modified resin beads prepared in the present example (TEM photograph; 10,000 times of the enlargement magnification ratio) with a transmission electron microscope is illustrated in FIG. 5.

Example 7

The present example is an example in which expandable modified resin beads are prepared in the same manner as Example 1 but with change of the kind of the dispersion diameter-enlarging agent and the polymerization temperature, and using the expandable modified resin beads, a foamed molded article formed from the expanded modified resin beads is manufactured.

Specifically, in the present example, styrene/butadiene-based thermoplastic elastomer (SBS: trade name:"TR2500" manufactured by JSR Corporation, MFR (200° C., 5 kgf): 10.2 g/10 min, SP value: 17.5 MPa$^{1/2}$) was used as a dispersion diameter-enlarging agent, instead of AS of Example 1.

In addition, in the present example, in the same manner as Example 1, the gas phase portion of the autoclave was replaced with nitrogen gas, temperature elevation was initiated and the temperature was elevated by taking 2 hours to a temperature of 88° C., the temperature was retained at this temperature of 88° C. for 30 minutes, the stirring rate was lowered to 450 rpm, the temperature was cooled to a temperature of 65° C. (the polymerization temperature) by taking 1 hour, and the temperature was retained as it was at the polymerization temperature of 65° C. for 12 hours.

Figure 6:
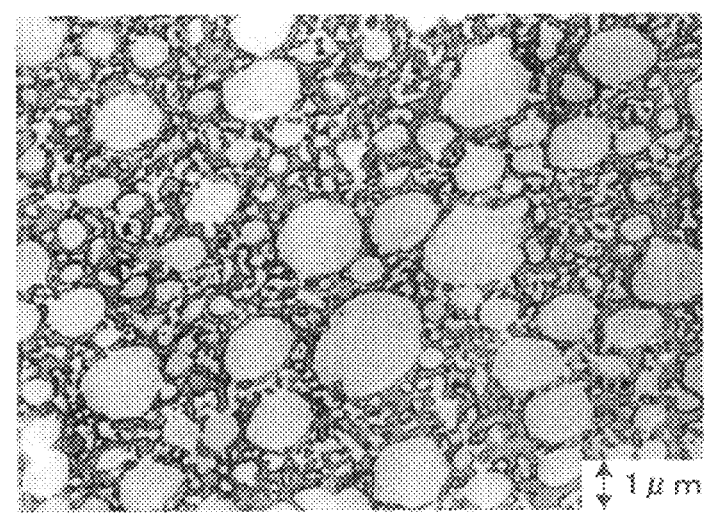
FIG. 6 is a photograph that is a substitution of a drawing, which illustrates results of observations of the central part of the expandable modified resin beads of Example 7 with a transmission electron microscope.

In the present example, expandable modified resin beads were prepared in the same manner as Example 1 except for these points. A photograph of the central part of the expandable modified resin beads prepared in the present example (TEM photograph; 10,000 times of the enlargement magnification ratio) with a transmission electron microscope is illustrated in FIG. 6.

Example 8

The present example is an example in which expandable modified resin beads are prepared using a blowing agent having different butane composition (blending ratio of n-butane and isobutane) from that of Example 1, and using the expandable modified resin beads, a foamed molded article formed from the expanded modified resin beads is manufactured.

Specifically, expandable modified resin beads were prepared in the same manner as Example 1 except for the point that 22.9 g of cyclohexane and 74.2 g of butane (a mixture of about 70% by volume of n-butane and about 30% by volume of isobutane) were used as a blowing agent, and they were put into the autoclave by taking about 1 hour.

Example 9

The present example is an example in which expandable modified resin beads are prepared in the same manner as Example 1 but the blending amount of the dispersion diameter-enlarging agent was reduced, and using the expandable modified resin beads, a foamed molded article formed from the expanded modified resin beads is manufactured.

Specifically, in the present example, expandable modified resin beads were prepared in the same manner as Example 1 except for the point that the addition amount of the dispersion diameter-enlarging agent (trade name: "AS-XGS", manufactured by DENKI KAGAKU KOGYO KABUSHIKI KAISHA) was 0.6 kg.

Example 10

The present example is an example in which expandable modified resin beads are prepared in the same manner as Example 1 but the blending amount of the dispersion diameter-enlarging agent is increased, and using the expandable modified resin beads, a foamed molded article formed from the expanded modified resin beads is manufactured.

Specifically, in the present example, expandable modified resin beads were prepared in the same manner as Example 1 except for the point that the addition amount of the dispersion diameter-enlarging agent (trade name: "AS-XGS", manufactured by DENKI KAGAKU KOGYO KABUSHIKI KAISHA) was 2 kg.

Example 11

The present example is an example in which expandable modified resin beads are prepared in the same manner as Example 1 but with change of the blending ratio of the olefin resin, and using the expandable modified resin beads, a foamed molded article formed from the expanded modified resin beads is manufactured.

Specifically, in the present example, expandable modified resin beads were prepared in the same manner as Example 1 except for the point that the addition amount of the ethylene-vinyl acetate copolymer (trade name: "Ultrathene 626", manufactured by TOSOH CORPORATION) containing 15% by mass of vinyl acetate was 2 kg, and the addition amount of the linear low density polyethylene resin (trade name: "NIPOLON 9P51A", manufactured by TOSOH CORPORATION) was 18 kg.

Example 12

The present example is an example in which expandable modified resin beads are prepared in the same manner as Example 1 but with change of the blending ratio of the olefin resin, and using the expandable modified resin beads, a foamed molded article formed from the expanded modified resin beads is manufactured.

Specifically, in the present example, expandable modified resin beads were prepared in the same manner as Example 1 except for the point that the addition amount of the ethylene-vinyl acetate copolymer (trade name: "Ultrathene 626", manufactured by TOSOH CORPORATION) containing 15% by mass of vinyl acetate was 8 kg, and the addition amount of the linear low density polyethylene resin (trade name: "NIPOLON 9P51A", manufactured by TOSOH CORPORATION) was 12 kg.

Example 13

The present example is an example in which expandable modified resin beads are prepared in the same manner as Example 1 but with change of the amount of styrene to be added to the nuclear particles, and using the expandable modified resin beads, a foamed molded article formed from the expanded modified resin beads is manufactured.

Specifically, in the present example, expandable modified resin beads were prepared in the same manner as Example 1 except for the point that the addition amount of the nuclear particles to the suspension agent was 171 g, the addition amount of styrene was 382 g, and further the addition amount of sodium nitrite (1% by mass aqueous solution) as the aqueous polymerization inhibitor was 10 g.

Example 14

The present example is an example in which expandable modified resin beads are prepared in the same manner as Example 1 but with change of the amount of styrene to be added to the nuclear particles, and using the expandable modified resin beads, a foamed molded article formed from the expanded modified resin beads is manufactured.

Specifically, in the present example, expandable modified resin beads were prepared in the same manner as Example 1 except for the point that the addition amount of the nuclear particles to the suspension agent was 228 g, and the addition amount of styrene was 325 g.

Example 15

The present example is an example in which expandable modified resin beads are prepared using a different blowing agent from that of Example 1, and using the expandable modified resin beads, a foamed molded article formed from the expanded modified resin beads is manufactured.

Specifically, expandable modified resin beads were prepared in the same manner as Example 1 except for the point that 2.3 g of 5% by mass ammonia water was added at the time when the temperature reached 90° C., and then 114 g of isopentane was added as the blowing agent.

Example 16

The present example is an example in which expandable modified resin beads are prepared in the same manner as Example 1 but with change of the amount of styrene to be added to the nuclear particles and so on, and using the expandable modified resin beads, a foamed molded article formed from the expanded modified resin beads is manufactured.

Figure 7:
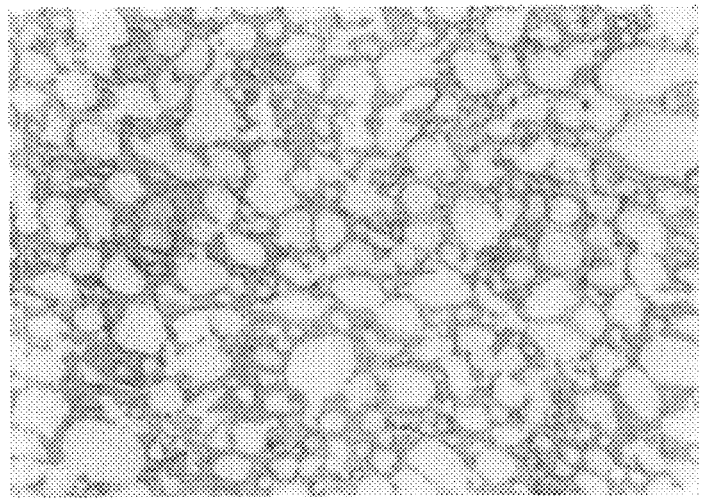
FIG. 7 is a photograph that is a substitution of a drawing, which illustrates results of observations of the central part of the expandable modified resin beads of Example 16 with a transmission electron microscope.

Specifically, in the present example, expandable modified resin beads were prepared in the same manner as Example 1 except for the point that the addition amount of the nuclear particles to the suspension agent was 142.5 g, the addition amount of styrene was 410.4 g, further the addition amount of sodium nitrite (1% by mass aqueous solution) as the aqueous polymerization inhibitor was 24.5 g, and in the same manner as Example 1, the gas phase portion of the autoclave was replaced with nitrogen gas, temperature elevation was initiated and the temperature was elevated by taking 2 hours to a temperature of 84° C., the temperature was retained at this temperature 84° C. for 30 minutes, and then the stirring rate was lowered to 450 rpm, the temperature was cooled to a temperature of 82° C. (the polymerization temperature) by taking 30 minutes, and the temperature was retained as it was at the polymerization temperature of 82° C. for 5 hours. A photograph of the central part of the expandable modified resin beads prepared in the present example (TEM photograph; 10,000 times of the enlargement magnification ratio) with a transmission electron microscope is illustrated in FIG. 7.

Example 17

The present example is an example in which expandable modified resin beads are prepared in the same manner as Example 1 but with change of the amount of styrene to be added to the nuclear particles and so on, and using the expandable modified resin beads, a foamed molded article formed from the expanded modified resin beads is manufactured.

Figure 8:
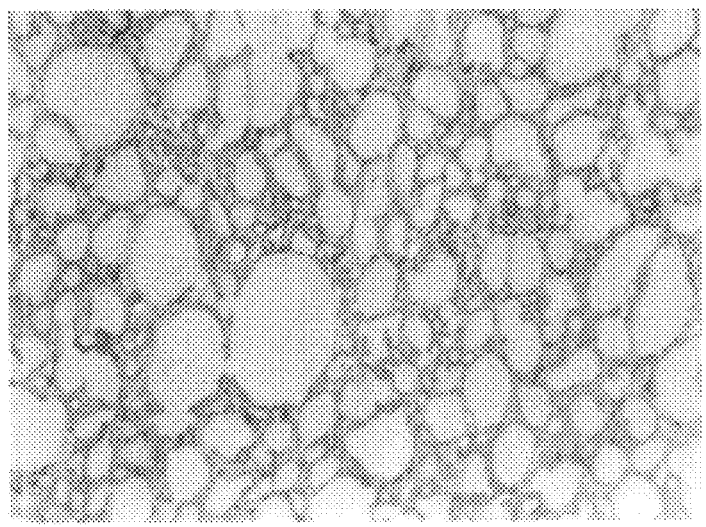
FIG. 8 is a photograph that is a substitution of a drawing, which illustrates results of observations of the central part of the expandable modified resin beads of Example 17 with a transmission electron microscope.

Specifically, in the present example, expandable modified resin beads were prepared in the same manner as Example 1 except for the point that the addition amount of the nuclear particles to the suspension agent was 114 g, the addition amount of styrene was 438.9 g, further the addition amount of sodium nitrite (1% by mass aqueous solution) as the aqueous polymerization inhibitor was 34.3 g, and in the same manner as Example 1, the gas phase portion of the autoclave was replaced with nitrogen gas, temperature elevation was initiated and the temperature was elevated by taking 2 hours to a temperature of 84° C., the temperature was retained at this temperature 84° C. for 30 minutes, the stirring rate was lowered to 450 rpm, the temperature was cooled to a temperature of 82° C. (the polymerization temperature) by taking 30 minutes, and the temperature was retained as it was at the polymerization temperature of 82° C. for 5 hours. A photograph of the central part of the expandable modified resin beads prepared in the present example (TEM photograph; 10,000 times of the enlargement magnification ratio) with a transmission electron microscope is illustrated in FIG. 8.

Also for Examples 2 to 17 described above, the blending ratio of the resin components of the nuclear particles, the polymerization temperature, the mass ratio of nuclear particles/styrene, the content of the blowing agent, the content of iC4+nC5+iC5, the 30° C.-corresponding life, the ratio of the blowing agent-decrease rates $V_0/V$, the volume average diameter of the dispersion phase, and the percentage of the dispersion phase of 0.6 $\mu m^2$ or more are listed in Table 2 described below in the same manner as Example 1.

In addition, a foamed molded article formed from the expanded modified resin beads was prepared using the expandable modified resin beads in the same manner as Example 1. Then, in the same manner as Example 1, for the foamed molded article formed from the expanded modified resin beads, the degree of internal fusion-bonding, the bending strength, and the compression stress were measured. They are listed in Table 2 described below.

Comparative Example 1

The present example is an example in which expandable modified resin beads are prepared without using a dispersion diameter-enlarging agent, and using the expandable modified resin beads, a foamed molded article formed from the expanded modified resin beads is manufactured.

Figure 9:
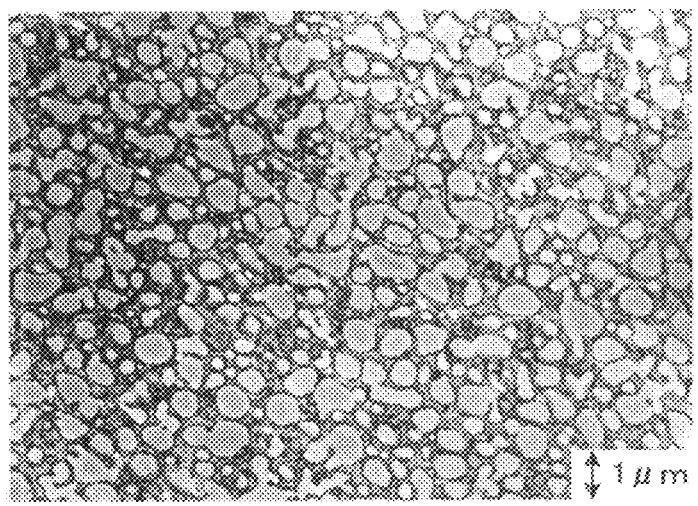
FIG. 9 is a photograph that is a substitution of a drawing, which illustrates results of observations of the central part of the expandable modified resin beads of Comparative Example 1 with a transmission electron microscope.

Specifically, expandable modified resin beads were prepared in the same manner as Example 1 except for the point that a dispersion diameter-enlarging agent was not added at the time of preparation of the nuclear particles. A photograph of the central part of the expandable modified resin beads prepared in the present example (TEM photograph; 10,000 times of the enlargement magnification ratio) with a transmission electron microscope is illustrated in FIG. 9.

Comparative Example 2

The present example is an example in which expandable modified resin beads are prepared with change of the composition of the nuclear particles, and using the expandable modified resin beads, a foamed molded article formed from the expanded modified resin beads is manufactured.

Figure 10:
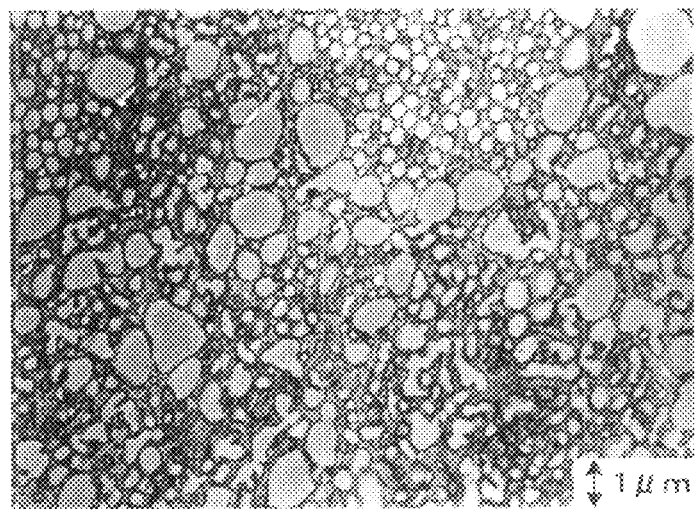
FIG. 10 is a photograph that is a substitution of a drawing, which illustrates results of observations of the central part of the expandable modified resin beads of Comparative Example 2 with a transmission electron microscope.

Specifically, in the present example, expandable modified resin beads were prepared in the same manner as Example 1 except for the point that polystyrene (PS: trade name: "680" manufactured by PS Japan Corporation., weight average molecular weight: 199,000, MFR (200° C., 5 kgf): 7.7 g/10 min, SP value: 18.1 $MPa^{1/2}$) was used instead of "AS-XGS". A photograph of the central part of the expandable modified resin beads prepared in the present example (TEM photograph; 10,000 times of the enlargement magnification ratio) with a transmission electron microscope is illustrated in FIG. 10.

Comparative Example 3

The present example is an example in which expandable modified resin beads are prepared with change of the composition of the nuclear particles and the polymerization conditions, and using the expandable modified resin beads, a foamed molded article formed from the expanded modified resin beads is manufactured.

Specifically, in the present example, an acrylonitrile-styrene copolymer (AS: trade name: "SANH", manufactured by Techno Polymer Co., Ltd., weight average molecular weight: 159,000, MFR (200° C., 5 kgf): 0.8 g/10 min, SP value: 20.0 $MPa^{1/2}$) was used instead of "AS-XGS".

Figure 11:
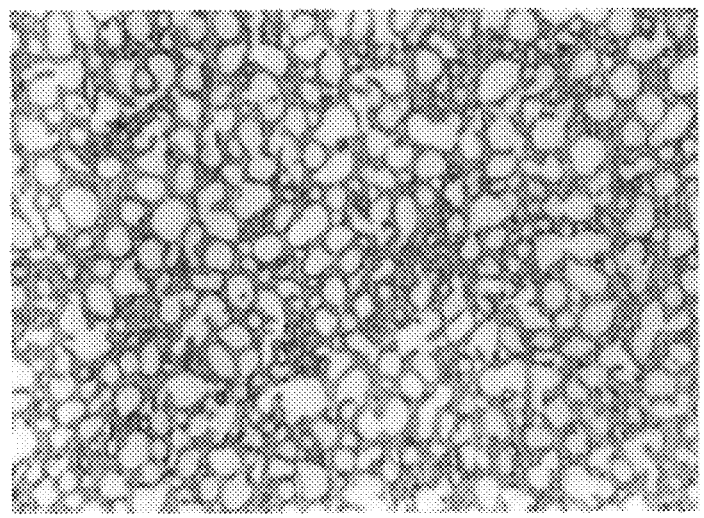
FIG. 11 is a photograph that is a substitution of a drawing, which illustrates results of observations of the central part of the expandable modified resin beads of Comparative Example 3 with a transmission electron microscope.

In addition, in the present example, expandable modified resin beads were prepared in the same manner as Example 1 except for the point that benzoyl peroxide as a polymerization initiator was 4.0 g (trade name: "NYPER BW", manufactured by Nippon Oil & Fats Co.,Ltd., water diluted powder article), and in the same manner as Example 1, the gas phase portion of the autoclave was replaced with nitrogen gas, temperature elevation was initiated and the temperature was elevated by taking 2 hours to a temperature of 90° C., the temperature was retained at this temperature of 90° C. for 30 minutes, and then the stirring rate was lowered to 450 rpm, the temperature was retained as it was at the polymerization temperature of 90° C. for 6 hours. A photograph of the central part of the expandable modified resin beads prepared in the present example (TEM photograph; 10,000 times of the enlargement magnification ratio) with a transmission electron microscope is illustrated in FIG. 11.

Also for Comparative Examples 1 to 3 described above, in the same manner as Example 1, the blending ratio of the resin components of the nuclear particles, the polymerization temperature, the mass ratio of nuclear particles/styrene, the content of the blowing agent, the content of iC4+nC5+iC5, the 30° C.-corresponding life, the ratio of the blowing agent-decrease rates $V_0/V$, the volume average diameter of the dispersion phase, and the percentage of the dispersion phase of 0.6 µm² or more are listed in Table 3 described below. For the expandable modified resin beads of Comparative Examples 2 and 3, measurement of the ratio of the blowing agent-decrease rates $V_0/V$ was carried out in which V was the blowing agent-decrease rate of those containing "680" and "SANH", and $V_0$ was the blowing agent-decrease rate of those not containing "680" and "SANH".

In addition, using the expandable modified resin beads, a foamed molded article formed from the expanded modified resin beads was prepared in the same manner as Example 1. Then, in the same manner as Example 1, for the foamed molded article formed from the expanded modified resin beads, the degree of internal fusion-bonding, the bending strength, and the compression stress were measured. They are listed in Table 3 described below.

Results of Examples and Comparative Examples

Results of Examples 1 to 17 and Comparative Examples 1 to 3 are listed in Table 2 and Table 3.

TABLE 2

| | | | Example No. | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 |
| Nuclear particles | LLDPE | NIPOLON Z 9P51A (part by mass) | | | | | | | | | | | 90 | 60 | | | 75 | | |
| | EVA | Ultrathene 626 (part by mass) | | | | | | 75 | | | | | | | 82 | 5 | | | |
| | AS | AS-XGS (part by mass) | 5 | 5 | 5 | 5 | | 25 | | 5 | | | 10 | 40 | | | 25 | | |
| | | GR-AT-5S (part by mass) | | | | | | | | | | 10 | | | | | | | |
| | MS | SANH (part by mass) | | | | | 5 | | | | | | | | | | | | |
| | | MS200 (part by mass) | | | | | | | | | | | | | | | | | |
| | PS | 679 (part by mass) | | | | | | | | | | | | | | | | | |
| | | 680 (part by mass) | | | | | | 5 | | | | | | | | | | | |
| | SBS | TR2500 (part by mass) | | | | | | | 5 | | | | | | | | | | |
| | | Polymerization Temperature (° C.) | 82 | | | | 65 | | 35/65 | | 90 | | | | | | | | |
| Expandable modified resin beads | | Nuclear particles/Styrene (mass ratio) | | | | | | | 35/65 | | | | | | 30/70 | 40/60 | 35/65 | 25/75 | 20/80 |
| | Properties | Content of blowing agent (% by mass) | 6.1 | 5.7 | 6.9 | 12.0 | 6.0 | 5.3 | 6.0 | 6.0 | 6.4 | 6.6 | 6.8 | 6.2 | 7.78 | 5.93 | 7.0 | 8.6 | 11.8 |
| | | Content of iC4 + nC5 + iC5 (%) | 41 | 39 | 43 | 21 | 48 | 40 | 46 | 13 | 43 | 45 | 45 | 42 | 37 | 49 | 100 | 65 | 51 |
| | | 30° C.-corresponding life (h) | 6.0 | 6.9 | 7.5 | 8.4 | 7.8 | 7.2 | 7 | 4.5 | 5.3 | 6.1 | 7.0 | 5.0 | 6.2 | 5.2 | 6.1 | 7.4 | 8.3 |
| | | $V_0/V$ | 1.83 | 2.80 | 3.37 | 2.31 | 2.74 | 2.61 | 2.31 | 1.65 | 1.91 | 1.89 | 2.01 | 1.61 | 1.89 | 1.61 | 1.89 | 2.68 | 2.91 |
| | Dispersion phase | Volume average diameter (μm) | 0.58 | 0.70 | 0.76 | 1.22 | 1.08 | 0.83 | 0.91 | 0.58 | 0.56 | 0.59 | 0.71 | 0.56 | 0.6 | 0.55 | 0.58 | 0.94 | 1.26 |
| | | Percentage of the dispersion phase having 0.6 μm² or more of the area (%) | 30.1 | 50.1 | 63.7 | 81.5 | 75.9 | 65.4 | 59.4 | 30.1 | 26.3 | 30.5 | 50.2 | 29.2 | 31 | 29.4 | 30.1 | 59.7 | 76.4 |
| Foamed molded article formed from expanded modified resin beads | 30 times of the expansion ratio | Degree of internal fusion-bonding (%) | | | | | 0.37 | | | | | 0.36 | | 0.35 | 0.37 | 0.35 | 0.37 | 0.4 | 0.42 |
| | | Maximum bending strength (MPa) | | | | | | 0.16 | | | | | | 0.16 | 0.16 | 0.155 | 0.16 | 0.17 | 0.18 |
| | | 10% deformation compression stress (MPa) | | | | | | | | | | | | | | | | | |
| | | 50% deformation compression stress (MPa) | | | | | | 0.25 | | | | | | 0.24 | 0.25 | 0.24 | 0.25 | 0.28 | 0.3 |
| | 50 times of the expansion ratio | Degree of internal fusion-bonding (%) | | 0.22 | | 0.22 | | | | 0.21 | 0.22 | | | 0.21 | | | 0.22 | 0.24 | 0.26 |
| | | Maximum bending strength (MPa) | | 0.085 | | 0.085 | | | | 0.08 | | 0.085 | | 0.08 | 0.085 | 0.075 | 0.085 | 0.1 | 0.11 |
| | | 10% deformation compression stress (MPa) | | 0.17 | | 0.17 | | | | 0.16 | | 0.17 | | 0.17 | 0.17 | 0.165 | 0.17 | 0.18 | 0.21 |
| | | 50% deformation compression stress (MPa) | | | | | | | | | | | | | | | | | |

LLDPE: linear low density polyethylene resin,
EVA: ethylene-vinyl acetate copolymer,
AS: acrylonitrile-styrene copolymer,
MS: methyl methacrylate-styrene copolymer
PS: polystyrene,
SBS: styrene/butadiene-based thermoplastic elastomer,
iC4: isobutane,
nC5: n-pentane,
iC5: isopentane

TABLE 3

|  |  |  | Comparative Example No. | 1 | 2 | 3 |
|---|---|---|---|---|---|---|
| Nuclear particles | LLDPE |  | NIPOLON Z 9P51A |  | 75 |  |
|  | EVA |  | Ultrathene 626 |  | 25 |  |
|  | AS |  | AS-XGS | — | — | — |
|  |  |  | GR-AT-5S | — | — | — |
|  |  |  | SANH | — | — | 5 |
|  | MS |  | MS200 | — | — | — |
|  | PS |  | 679 | — | — | — |
|  |  |  | 680 | — | 5 | — |
|  | SBS |  | TR2500 | — | — | — |
|  |  |  | Polymerization Temperature (° C.) | 82 |  | 90 |
| Expandable modified resin beads |  |  | Nuclear particles/Styrene (mass ratio) |  | 35/65 |  |
|  | Properties |  | Content of blowing agent (% by mass) | 5.2 | 6.2 | 5.2 |
|  |  |  | Contnet of iC4 + nC5 + iC5 (%) | 32 | 45 | 41 |
|  |  |  | 30° C-corresponding life (h) | 1.2 | 2.8 | 3 |
|  |  |  | $V_0/V$ | — | 1.17 | 1.2 |
|  | Dispersion phase |  | Volume average diameter (μm) | 0.52 | 0.46 | 0.51 |
|  |  |  | Percentage of the dispersion phase having 0.6 μm² or more of the area (%) | 20.3 | 26.2 | 28.8 |
| Foamed molded article formed from expanded modified resin beads | 30 times of the expansion ratio |  | Degree of internal fusion-bonding (%) |  | 90 |  |
|  |  |  | Maximum bending strength (MPa) |  | 0.37 |  |
|  |  |  | 10% deformation compression stress (MPa) |  | 0.16 |  |
|  |  |  | 50% deformation compression stress (MPa) |  | 0.25 |  |
|  | 50 times of the expansion ratio |  | Degree of internal fusion-bonding (%) |  | 90 |  |
|  |  |  | Maximum bending strength (MPa) |  | 0.22 |  |
|  |  |  | 10% deformation compression stress (MPa) |  | 0.085 |  |
|  |  |  | 50% deformation compression stress (MPa) |  | 0.17 |  |

LLDPE: linear low density polyethylene resin, EVA: ethylene-vinyl acetate copolymer
AS: acrylonitrile-styrene copolymer, MS: methyl methacrylate-styrene copolymer
PS: polystyrene, SBS: styrene/butadiene-based thermoplastic elastomer
iC4: isobutane, nC5: n-pentane, iC5: isopentane As known from Table 2 and Table 3, the expandable modified resin beads of Examples 1 to 17 are excellent in the retaining property of the blowing agent, and the foamed molded articles of expanded beads prepared using these expandable modified resin beads show unique bending deflection of an olefin resin.

On the contrary, for the expandable modified resin beads of Comparative Examples 1 to 3, the foamed molded articles prepared using these could exhibit enough bending deflection, but for the expandable modified resin beads, the blowing agent easily dissipated, and the retaining property of the blowing agent was insufficient.

In addition, as known from Table 2 and Table 3, it is found out that the retaining property of the blowing agent can be improved by setting the volume average diameter of the dispersion phase to 0.55 μm or more. Furthermore, it is found out that the retaining property of the blowing agent can be further improved by setting the percentage of the dispersion phase having 0.6 μm² or more of the area to 25% or more. Reasons therefore are contemplated as described below.

The physical blowing agent added in a process of manufacturing the expandable modified resin beads is dissolved in a polymer phase. Specifically, the physical blowing agent is impregnated into the continuous phase comprising an olefin resin that is easily impregnated with the blowing agent, and the dispersion phase comprising a styrene resin that is hardly impregnated with the blowing agent. It is contemplated that impregnated physical blowing agent comes out initially from the continuous phase from which dissipation of the blowing agent easily occurs as time passes. However, in a case where the volume average diameter of the dispersion phase is large, and more preferably in a case where the percentage of the dispersion phase having 0.6 μm² or more of the area is large, the contact area of the dispersion phase and the continuous phase decreases. Therefore, it can be inferred that the retaining property of the blowing agent increases as explained in the above-mentioned Examples.

When the internal cross-sections of the expandable modified resin beads obtained in the Examples were observed with a transmission electron microscope, a sea-island structure was observed. For example, FIG. 2 is a photograph of the central part of the expandable modified resin beads obtained in Example 1 (10,000 times of the enlargement magnification ratio) with a transmission electron microscope. On the internal cross-section of expandable modified resin beads, a dispersion phase having 0.58 μm of the volume average diameter is formed with dispersed in a circular form, a polygonal form or an infinite form, and the percentage of the dispersion phase having 0.6 μm² or more of the area is 30.1%. In addition, for example, FIG. 3 is a photograph of the central part of the expandable modified resin beads obtained in Example 4 (10,000 times of the enlargement magnification ratio) with a transmission electron microscope. On the internal cross-section of expandable modified resin beads, a dispersion phase having 1.22 μm of the volume average diameter is formed with dispersed in a circular form, a polygonal form or an infinite form that is formed by coalescence of two or more dispersion phases, and the percentage of the dispersion phase having 0.6 μm² or more of the area is 81.5%.

In addition, remarkable difference is manifested in the dissipation of the blowing agent depending on storage conditions (in a condition of open to the outside air, or sealed state, atmosphere temperature), but the expandable modified resin beads obtained in Examples 1 to 17 can show high retaining property of the blowing agent in a process room for expanding and molding (about 30° C. temperature, in a condition of open to the outside air) even in summer season.

Figure 12:
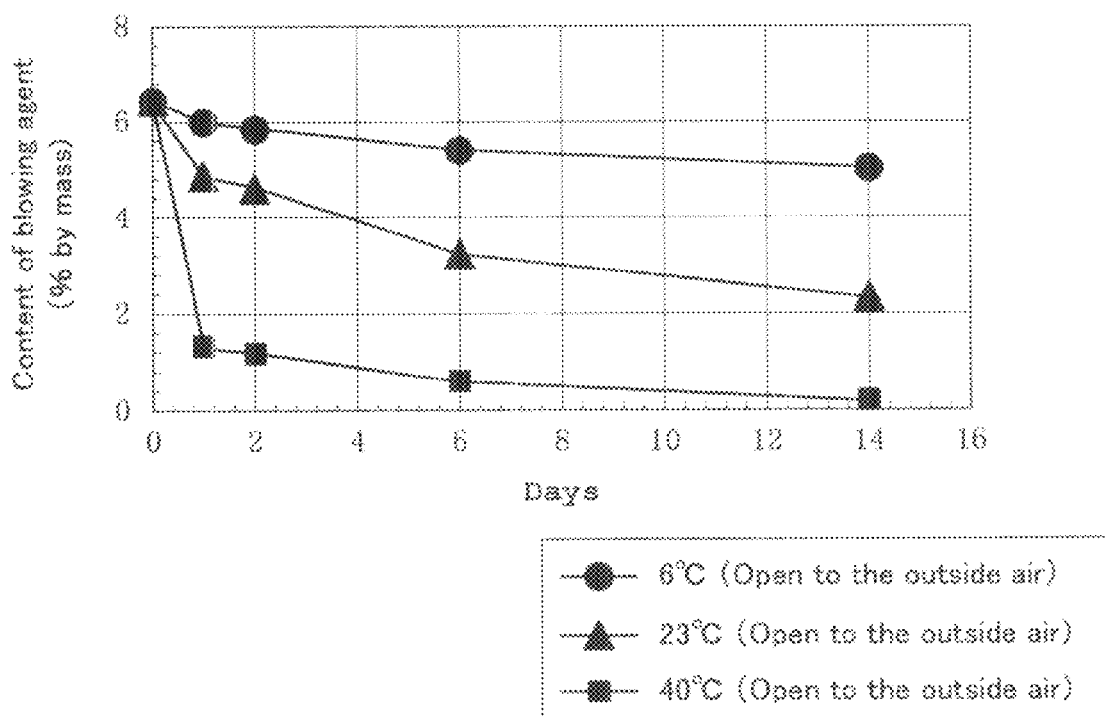
FIG. 12 is an explanation drawing that illustrates the relationship between storage days (per day) and the amount of a blowing agent when the expandable modified resin beads (Example 1) in Examples are stored at specific storage temperatures.
Figure 13:
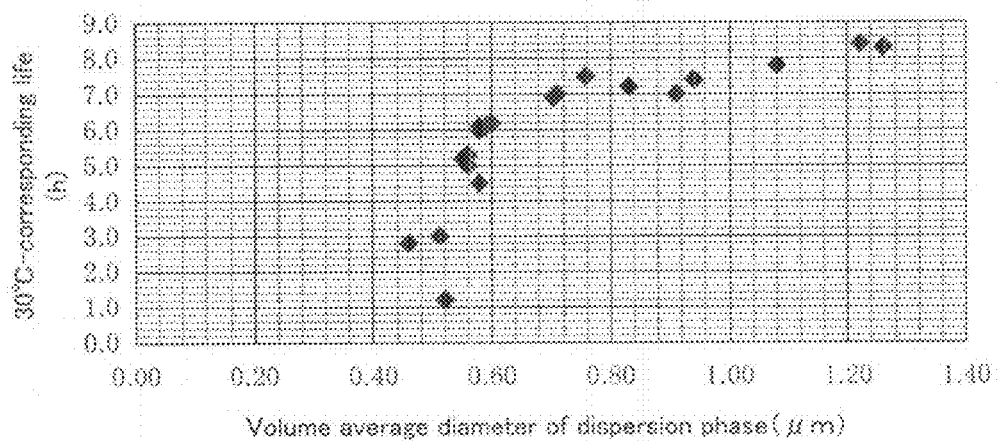
FIG. 13 is an explanation drawing that illustrates the relationship between the volume average diameter of the dispersion phase and the 30° C.-corresponding life in Examples.
Figure 14:
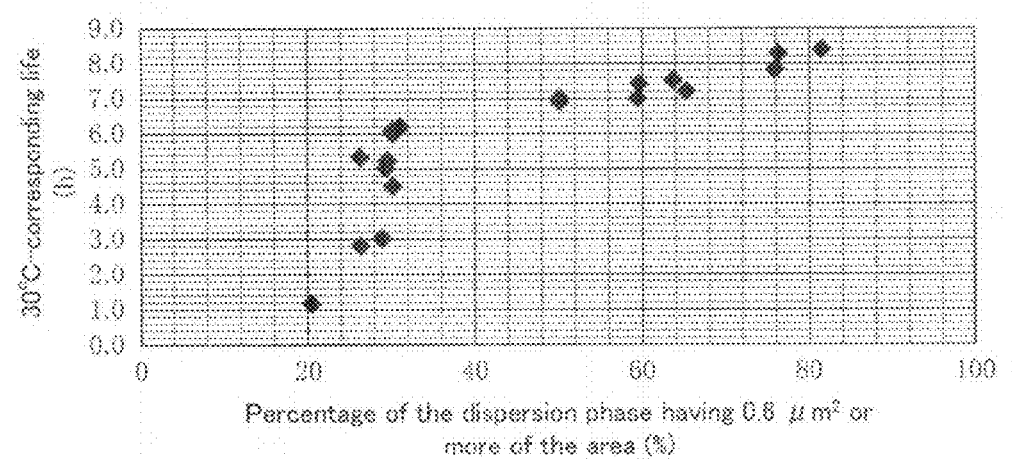
FIG. 14 is an explanation drawing that illustrates the relationship between the percentage of the dispersion phase having 0.6 μm$^2$ or more of the area and the 30° C.-corresponding life in Examples.

This is supported by the graphs illustrated in FIGS. 12 to 14.

Specifically, FIG. 12 is a graph that illustrates dissipation of the blowing agent depending on the storage temperature of the expandable modified resin beads obtained in Example 1. From this graph, it is found out that as the storage temperature increases, the blowing agent dissipates more.

In addition, FIG. 13 is a graph that illustrates the relationship of the volume average diameter of the dispersion phase and the 30° C.-corresponding life. From this graph, it is found out that as the volume average diameter of the dispersion phase increases, the 30° C.-corresponding life is longer.

In addition, FIG. 14 is a graph that illustrates the relationship of the percentage of the dispersion phase having 0.6 µm² or more of the area and the 30° C.-corresponding life. From this graph, it is found out that as the percentage of the dispersion phase of 0.6 µm² or more increases, the 30° C.-corresponding life is longer.

The invention claimed is:

1. A method for producing an expandable modified resin bead, comprising a modified resin as a base resin and a physical blowing agent, wherein the modified resin comprises a continuous phase comprising an olefin resin and a dispersion phase, dispersed in the continuous phase, comprising a styrene resin, the method comprising:
impregnating styrene-based monomers into a nuclear particle comprising the olefin resin and a dispersion diameter-enlarging agent capable of enlarging a volume average diameter of the dispersion phase;
polymerizing the styrene-based monomers to obtain a modified resin bead having a continuous phase and a dispersion phase; and
impregnating the resin bead with a physical blowing agent during or after polymerization of the styrene-based monomers,
wherein
the dispersion diameter enlarging agent comprises at least one substance selected from the group consisting of a methyl methacrylate-styrene copolymer, polystyrene, a styrene-based elastomer selected from a styrene-butadiene-styrene block copolymer, a styrene-isoprene-styrene block copolymer, and a hydrate of these block copolymers, rubber modified polystyrene, an ABS resin, an AES resin, polyvinyl chloride, and polyvinylidene chloride, in which the substance is different from the styrene resin of the dispersion phase.

2. The method of claim 1, wherein a content of the dispersion diameter enlarging agent in the nuclear particle is from 1 to 10 parts by mass, with respect to 100 parts by mass of the olefin resin.

3. The method of claim 1, wherein a blend ratio of the nuclear particles to the styrene-based monomers is from 20/80 to 50/50 in a mass ratio of nuclear particles/styrene-based monomers.

4. The method of claim 1, wherein the olefin resin comprises a linear low density polyethylene, an ethylene-vinyl acetate copolymer, or both.

5. The method of claim 1, wherein a polymerization initiator and a cross-linking agent are previously dissolved in the styrene-based monomers.

6. The method of claim 1, wherein a polymerization temperature is adjusted to from 60 to 85° C.

7. The method of claim 1, wherein the physical blowing agent comprises:
a hydrocarbon having from 4 to 6 carbon atoms and at least one substance selected from the group consisting of isobutane, n-pentane, and isopentane,
wherein a content of the at least one substance is 20 parts by mass or more with respect to 100 parts by mass of a total amount of the physical blowing agent.

8. The method of claim 1, wherein a content of the physical blowing agent is from 5 to 30 parts by mass with respect to 100 parts by mass of the modified resin.

9. The method of claim 1, wherein a volume average diameter of the dispersion phase dispersed in the continuous phase is 0.55 µm or more.

10. The method of claim 1, wherein a volume average diameter of the dispersion phase is 0.6 µm or more.

11. The method of claim 9, wherein a volume average diameter of the dispersion phase is 10 µm or less.

12. The method of claim 1,
wherein the modified resin comprises from 75 to 55 parts by mass of the styrene resin and from 25 to 45 parts by mass of the olefin resin, based on a total amount of the styrene resin and the olefin resin of 100 parts by mass.

13. The method of claim 1,
wherein the modified resin comprises from 75 to 65 parts by mass of the styrene resin and from 25 to 35 parts by mass of the olefin resin, based on a total amount of the styrene resin and the olefin resin of 100 parts by mass.

14. The method of claim 1,
wherein the dispersion diameter-enlarging agent has a melt mass flow rate (MFR (200° C., 5 kgf)) of from 1 g/10 min to 500 g/10 min.

15. The method of claim 14,
wherein the MFR (200° C., 5 kgf) is from 2 g/10 min to 200 g/10 min.

16. The method of claim 1, wherein a content of the dispersion diameter-enlarging agent in the nuclear particle is from 3 to 7 parts by mass with respect to 100 parts by mass of the olefin resin.

* * * * *